United States Patent
Golub et al.

(10) Patent No.: US 8,081,244 B2
(45) Date of Patent: Dec. 20, 2011

(54) SNAPSHOT SPECTRAL IMAGING SYSTEMS AND METHODS

(76) Inventors: Michael Golub, Rehovot (IL); Menachem Nathan, Tel Aviv (IL); Amir Averbuch, Tel Aviv (IL)

( * ) Notice: Subject to any disclaimer, the term of this patent is extended or adjusted under 35 U.S.C. 154(b) by 561 days.

(21) Appl. No.: 12/374,308

(22) PCT Filed: Jul. 23, 2007

(86) PCT No.: PCT/IL2007/000926
§ 371 (c)(1),
(2), (4) Date: Jan. 18, 2009

(87) PCT Pub. No.: WO2008/012812
PCT Pub. Date: Jan. 31, 2008

(65) Prior Publication Data
US 2010/0013979 A1     Jan. 21, 2010

Related U.S. Application Data

(60) Provisional application No. 60/888,101, filed on Feb. 5, 2007, provisional application No. 60/865,651, filed on Nov. 14, 2006, provisional application No. 60/832,591, filed on Jul. 24, 2006.

(51) Int. Cl.
*H04N 3/14* (2006.01)
*H04N 5/335* (2006.01)
*G01J 3/28* (2006.01)

(52) U.S. Cl. .......... 348/294; 348/302; 356/326
(58) Field of Classification Search .......... 348/294, 348/302, 308, 311; 356/326
See application file for complete search history.

(56) References Cited

U.S. PATENT DOCUMENTS

| | | | |
|---|---|---|---|
| 5,604,531 A | 2/1997 | Iddan et al. | |
| 6,522,403 B2 | 2/2003 | Wilson et al. | |
| 7,092,088 B2 | 8/2006 | Schau | |
| 7,283,232 B2 * | 10/2007 | Brady et al. | 356/326 |
| 2003/0133109 A1 | 7/2003 | Murguia | |
| 2005/0154277 A1 | 7/2005 | Tang et al. | |
| 2006/0072109 A1 | 4/2006 | Bodkin et al. | |
| 2006/0146140 A1 | 7/2006 | Kennedy | |

(Continued)

FOREIGN PATENT DOCUMENTS
WO   WO0284363   10/2002

OTHER PUBLICATIONS

Fish A.; Yadid-Pecht O., 'Active Pixel Sensor Design: From Pixels To Systems', CMOS Imagers: From Phototransduction to Image Processing, ISBN 1-4020-7961-3, Kluwer Academic Publishers, (2004).

(Continued)

*Primary Examiner* — William Choi
(74) *Attorney, Agent, or Firm* — Nathan & Associates Patent Agents Ltd.; Menachem Nathan

(57) ABSTRACT

Digital cameras for spectrally imaging an object or scene comprise an imaging component, a fixed one-dimensional disperser and an image sensor having sensor pixels, the disperser and image sensor arranged with matching optical parameters and in a predetermined spatial relationship. Each sensor pixel detects multiplexed spectral information from at least two adjacent object points and the spectral information detected by each sensor pixel is demultiplexed and processed into spectral-spatial data to provide spectral images.

22 Claims, 17 Drawing Sheets

U.S. PATENT DOCUMENTS

2006/0247514 A1 11/2006 Panasyuk et al.
2007/0024946 A1 2/2007 Panasyuk et al.
2007/0038042 A1 2/2007 Freeman et al.

OTHER PUBLICATIONS

Garini Y. et al, 'Spectral Imaging: Principles and Applications', Cytometry Part A, 2006, pp. 735-747, 69A.

Carlsohn M.F., 'Spectral Image Processing in Real-time', J. Real Time Image Processing, 2006, pp. 25-32, vol. 1.

Descour M.; Dereniak E. 'Computed-tomography Imaging Spectrometer: Experimental Calibration and Reconstruction Results', Applied Optics, 1995, pp. 4817-4826, vol. 34, No. 22.

Johnson, W.R.; Wilson, D.W.; Fink, W., 'Snapshot Hyperspectral Imaging in Ophthalmology', J. Biomedical Optics, Jan./Feb. 2007, pp. 014036 vol. 12(1).

Shepp, L.A.; Vardi, Y., 'Maximum Likelihood Reconstruction for Emission Tomography', IEEE Transactions On Medical Imaging, Oct. 1982, pp. 113-122, vol. MI-1, No. 2.

Gordon, R.; Bender, R.; Herman, G.T., 'Algebraic Reconstruction Techniques (ART) For Three-dimensional Electron Microscopy and X-ray Photography', J. Theor. Biol., 1970, pp. 471-481, vol. 29.

Averbuch, A.; Zheludev, V., 'Spline-based Deconvolution', Signal Processing, 2009, pp. 1782-1797, 89.

Levenson, R.M.; Mansfield, J.R., 'Multispectral Imaging In Biology And Medicine: Slices Of Life', Cytometry Part A, 2006, pp. 748-758, 69A.

Kostenich, G. et al, 'Monitoring PDT-induced Damage Using Spectrally Resolved Reflectance Imaging Of Tissue Oxygenation' Cancer Letters, 2005, pp. 169-175, 219.

Shealy, D. L., 'Classical (Non-laser) Methods', in Dickey and Holswade, Laser Beam Shaping Theory And Technologies, Marcel Dekker, Inc., New York-Basel, pp. 313-348, (2000).

Golub et al, 'New Diffractive Beam Shaper Generated With The Aid of E-beam Lithography', Optical Engineering, May 1996, pp. 1400-1406, vol. 35 No. 5.

* cited by examiner

Spatial feature Φ with area A, and including S sensor pixels

The number of spatial features is K

FIG. 5 (in color)

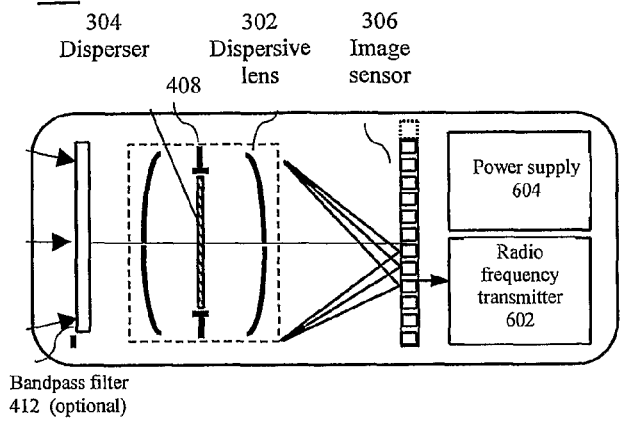
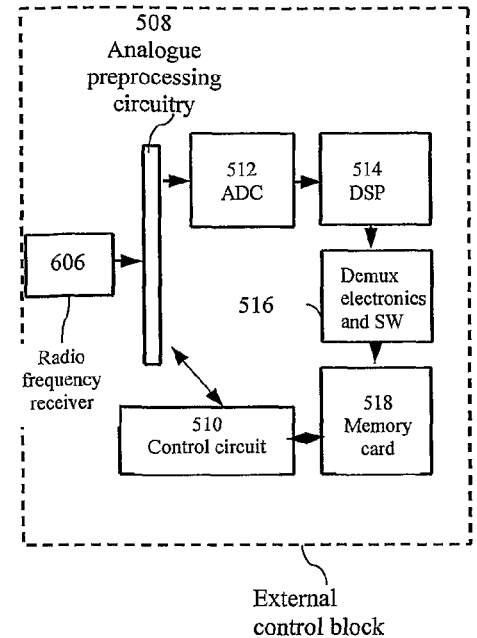
FIG. 15
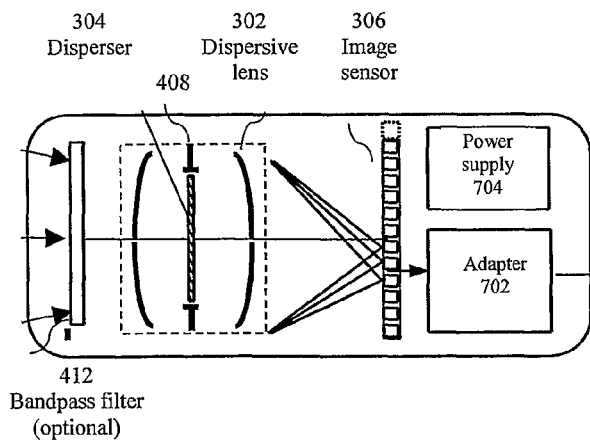
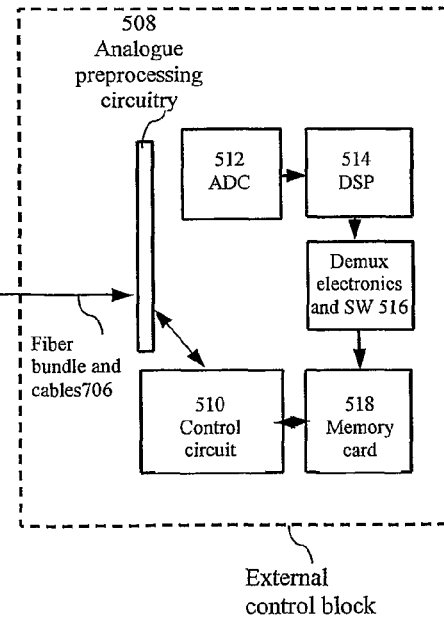
FIG. 16

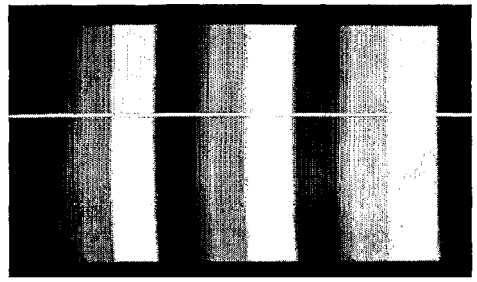
FIG. 18A
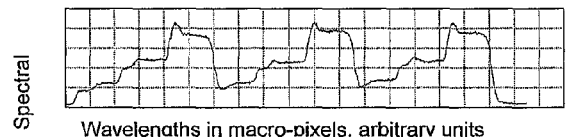
FIG. 18B
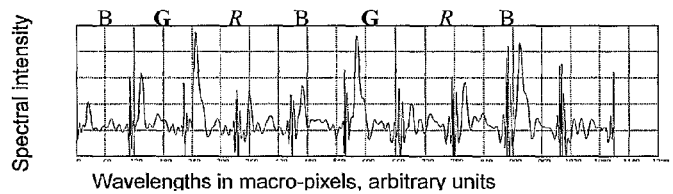
FIG. 19A
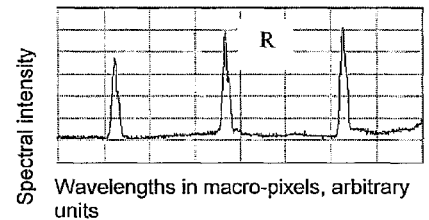
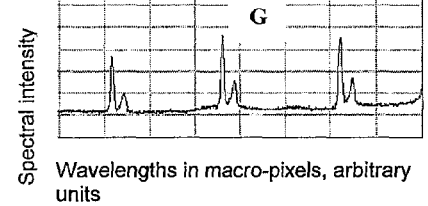
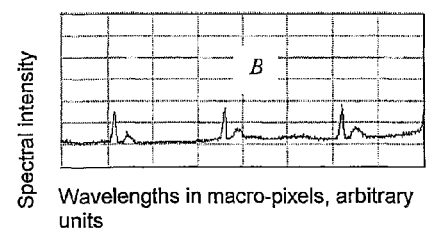
FIG. 19B

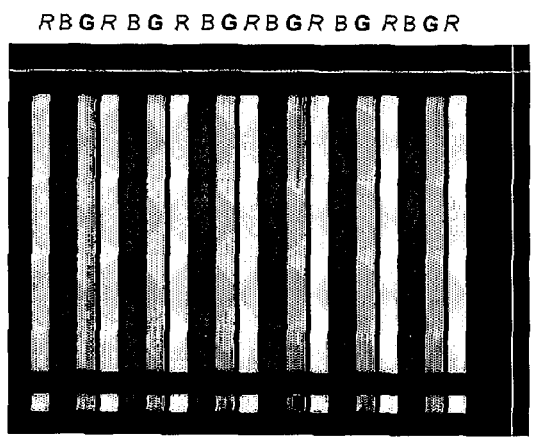 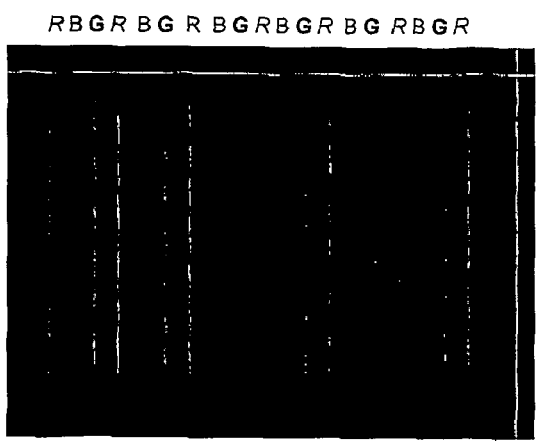
FIG. 20 (in color)　　　　　　　　FIG. 21 (in color)

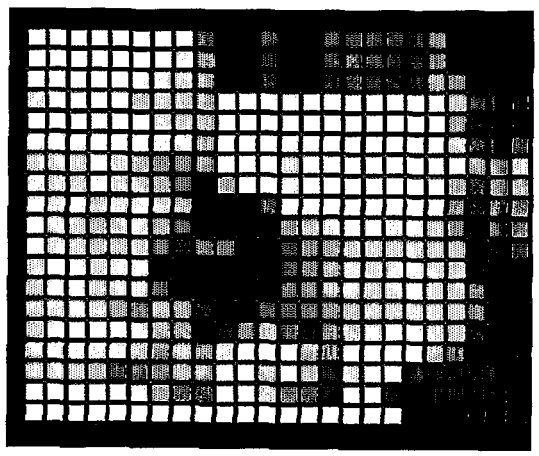
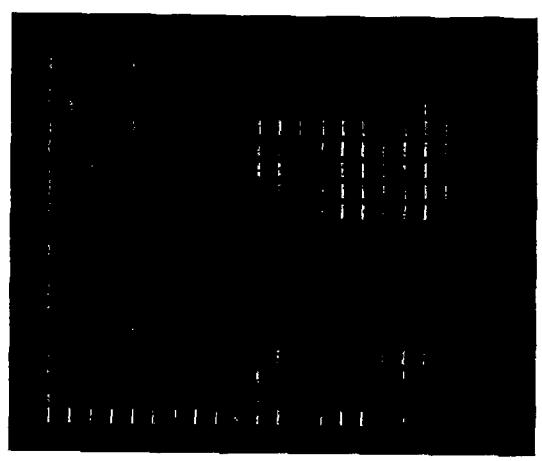
FIG. 25 (in color)
FIG. 26 (in color)

SNAPSHOT SPECTRAL IMAGING SYSTEMS AND METHODS

FIELD OF THE INVENTION

The present invention relates in general to spectral imaging systems and methods and in particular to multispectral and hyperspectral imaging performed with monochromatic or monochromatic-mode digital cameras adapted for snapshot (without any scanning) acquisition of full spectral-spatial data cubes.

BACKGROUND OF THE INVENTION

Digital cameras have largely replaced analog and film cameras in many applications, including (but not limited to) regular consumer (amateur and professional) photography, cellphones, medical imaging, remote sensing and security monitoring. Digital cameras use image sensors (also referred to as "area array detectors" or "imaging elements") with millions of pixels per chip, typically of either charge coupled device (CCD) type, complementary metal-oxide-semiconductor (CMOS) type, focal plane array (FPA) type or microbolometer type. There are various known types of CCD, CMOS and FPA image sensors. In particular, CMOS sensors may be of active pixel, passive pixel or digital pixel type. Active pixel CMOS sensors can incorporate data conversion and processing in addition to photon detection on the same chip, leading to so called "camera-on-chip" systems, see e.g. "Active Pixel Sensor Design: From Pixels to Systems" by A. Fish and O. Yadid-Pecht" in "CMOS Imagers: From Phototransduction to Image Processing", ISBN 1-4020-7961-3, Kluwer Academic Publishers (hereinafter "Fish"). Most image sensors have microlenses built on their pixels to increase light capture. For simplicity, an image sensor is referred to hereinafter simply as "sensor".

A block diagram of a typical digital camera system 100 is shown in FIG. 1. The figure is taken from Fish. The figure shows the difference between the building blocks of a CCD camera and of a CMOS camera-on-chip. A CCD camera typically includes a lens 102, an on-chip or off-chip color filter 104, a sensor (CCD) 106, an analog signal chain (ACS) 108 for amplification and a control block 110 for controlling the functions of the sensor and the ACS. A CMOS camera-on-chip includes the same elements (except that sensor 106 is an active CMOS sensor) plus an analog-to-digital converter (ADC) 112 and a digital signal processor (DSP) 114, both coupled to the control block. In the prior art, one may also find block diagrams with elements that are given somewhat different names, but which in essence refer to the same functionalities.

Spectral imaging (SI) systems (also referred to herein as "spectral imagers" or "SI cameras") are well known in the art. Their main function is to access images of an object or scene separately in several spectral ranges (wavelength or "spectral" bands) of the spectrum. The number of spectral bands substantially exceeds the three RGB (red-green-blue) bands typical for state-of-the-art color digital cameras. Acquisition of the full spectrum enables recognition of spectral signatures of chemical substances and their position within the object. Furthermore, an image of the object in any selected spectral band can uncover hidden properties of the object that may be important to an application. Depending on the number of spectral bands used, spectral imagers are referred to as being either multispectral (MS) or hyperspectral (HS). The differentiation between "MS" and "HS" is somewhat arbitrary, one definition having "MS" including up to 10 spectral bands and "HS" as having more than 10 spectral bands.

Spectral imaging involves acquisition of a three-dimensional "data cube" (also referred to as spatial-spectral cube, spectral cube, object cube, image cube or hypercube) having two spatial dimensions and one spectral dimension. The SI principle of operation is widely known (see. e.g. Y. Garini et al., "Spectral Imaging: Principles and Applications", Cytometry Part A, 69A 735-747 (2006)) Most spectral imagers acquire simultaneously only two out of the three data cube dimensions. The third dimension is acquired sequentially (i.e. by scanning). They can be broadly classified (see M. F. Carlsohn, "Spectral image processing in real-time", J. Real Time Image Processing, vol. 1, p. 25-32, 2006) as either "staring" imagers or "pushbroom" imagers. In staring imagers the simultaneous acquisition is of both spatial dimensions, with the spectral dimension acquired sequentially (wavelength scanning). In pushbroom imagers, the simultaneous acquisition is of the spectral dimension and of one spatial dimension, with the second spatial dimension acquired sequentially (spatial scanning). In both cases, the data cube is acquired sequentially in time (temporal scanning). Neither staring nor pushbroom imagers are particularly relevant to the present invention.

The SI class most relevant to the present invention is that of so-called "snapshot" imagers. These imagers perform simultaneous and instantaneous ("snapshot") acquisition of all three data cube dimensions, without any type of scanning. Most snapshot SIs are based on non-scanning computed tomographic imaging spectrometer (CTIS) designs, see e.g. M. Descour and E. Dereniak, Applied Optics, Vol. 32, p. 4817-4825, 1995. CTIS designs use one of two dispersing element ("disperser") types: a rotating disperser (prism or grating) or a two-dimensional grating disperser (e.g. in U.S. Pat. No. 6,522,403 to Wilson and U.S. Pat. No. 7,092,088 to Schau). A block diagram of a typical CTIS system 200 (taken from Schau) is shown in FIG. 2. System 200 includes fore-optics 202, a disperser 204, a field lens 206 and a FPA 208. The output of the FPA is processed in a processor (DSP) 210. A CTIS-based SI camera is being advertised by SnapShot Spectra, 974 East Elizabeth, Pasadena, Calif. 91104, USA, and has been successfully used in ophthalmology (W. R. Johnson, D. W. Wilson and W. Fink, "Snapshot hyperspectral imaging in opthalmology", J. Biomedical Optics, 12(1), 014036, January/February 2007).

All CTIS designs inherently require a plurality of diffraction orders to be provided by the rotating or two-dimensional grating disperser. Major disadvantages of CTIS-based SI cameras include the need to have a field stop and to form an intermediate image, thereby leading to necessarily more complicated and expensive optics.

Other types of snapshot SI imagers, e.g. as disclosed in US patent application 20060072109 by Bodkin, use a lenslet and/or pinhole array to divide a field of view into multiple channels, which in turn are dispersed into multiple spectral signatures and observed on a two-dimensional FPA in real time.

Key disadvantages of existing snapshot spectral imagers include complicated and expensive optical setups, some requiring moving parts, a lack of miniaturization leading to relatively large sizes and high cost. The smallest and least expensive spectral imagers (of any type) are still significantly larger and more expensive (the latter by at least an order of magnitude) than state-of-the-art digital cameras. The factors of size and cost become critical in both consumer markets and in applications requiring miniaturized and disposable imaging systems, for example in-vivo imagers such as the gastrointestinal (GI) tract capsule ("also referred to as "diagnostic pill") described in U.S. Pat. No. 5,604,531. GI capsules of this type can provide only simple spatial optical information. A GI capsule functionality may be significantly enhanced by adding spectral imaging capabilities to perform a so-called "optical biopsy", i.e. detection of tissue disease such as cancer using spectral imaging. While some spectral imaging GI capsules have been suggested, see US Patent Application No. 20050154277 by Tang et al., their optical set-ups are complicated, requiring many sub-elements, and consequently difficult to implement in the very restricted space available in such capsules.

To summarize—the state of the art in SI cameras is very far from making such cameras a commodity consumer mass product like regular digital cameras. SI camera miniaturization is even further away from realization. There is therefore a need for, and it would be advantageous to have inexpensive and simple to operate snapshot SI cameras. It would be particularly advantageous to be able to adapt or convert a digital camera into a snapshot SI camera without significantly increasing its size, complexity or cost. It would be further particularly advantageous to have miniaturized snapshot SI cameras that can be used in GI capsules, endoscopes, cellphones, PDAs and similar applications. Some of these advantages may be realized by adding on-chip spectral data acquisition and processing capabilities to sensors, in particular CMOS sensors, opening the way to "SI camera-on-chip" systems.

SUMMARY OF THE INVENTION

In some basic embodiments, the present invention allows conversion of any digital camera into a spectral imager by addition of a disperser in the optical path between an imaged object and the image sensor (and which crosses the camera lens). The disperser is best placed in the vicinity of a system aperture of the camera lens or in the vicinity of any plane which is image-conjugate with the system aperture of the lens, including the entrance pupil or the exit pupil of the lens. Note however that it is possible to permit deviation from these planes, which will result in some non-uniformity of intensity in the transfer from the ideal image (explained below) to the non-dispersed image (explained below). The entrance pupil is usually either slightly before the lens (between lens and imaged object) or inside the lens assembly. The exit pupil is usually either slightly after the lens (between lens and image sensor) or inside the lens assembly. The lens may be any known type of lens used in digital imaging, including a multiple lens system, a camera lens with refractive and/or diffractive optical elements, a zoom lens, or a camera lens with asymmetrical aspherical surfaces which correct aberrations and distortion of a disperser prism. Specifically, construction of the lens should permit mechanical introduction of a disperser prism or diffraction grating. Preferably, the lens may be implemented as an "External pupil lens system", as taught by European Patent No. EP1377864. The disperser should then be installed at the position of the entrance pupil of the system, which is located externally to the lens system.

Preferably, the disperser is fixed and the dispersion is one-dimensional. In some embodiments, the disperser and lens may be combined into a single unit. In some embodiments, the disperser is assembled in a block with a blurring optical element. In some embodiments, the disperser may be inserted into and removed from the optical path, thereby allowing both regular (non-spectral) imaging (which results in a "non-dispersed image" at the sensor plane) and spectral imaging (which results in a "dispersed image" at the sensor plane) with the same camera. In some embodiments, simultaneous regular and spectral imaging may be achieved without moving the disperser. In all embodiments, the spectral imaging is based on the concept of a spatial feature $\Phi$ at the sensor plane which is assigned essentially a single value of intensity for each spectral band, see FIG. 3. Inventively, the optical system is built such that $\Phi$ is a representative feature of the non-dispersed image. Further inventively and uniquely to the present invention, spatial feature $\Phi$ has an area A that matches the number of wavelength bands S multiplied by a single sensor pixel area $\delta x \cdot \delta y$ and a featuresize $\Delta$ that matches a complete lateral dispersive shift $\Delta d$.

To better understand this concept, assume that the sensor has $N=N_x N_y$ pixels, where $N_x$ is the number of pixels along the x-axis (e.g. a row) and $N_y$ is the number of pixels along the y-axis (e.g. a column). The number K of spatial features $\Phi$ is then equal to:

$$K = N/S \qquad (1)$$

The spectral cube obtained using this concept then includes K spatial features $\Phi$ multiplied by S wavelength bands. Therefore, the number of "voxels" in the spectral cube is equal to $K \cdot S \equiv N$, in accordance with Eq. (1, as expected.

A dispersed image of the present invention is formed from radiation with different wavelengths received from at least two different points of the object at each sensor pixel. We use the terms "multiplexed" or "multiplexing" to describe the nature of the spectral mixing obtained at each sensor pixel, the "per pixel" spectral mix inputs originating from different object points. The concept disclosed here allows us to de-multiplex digitally a dispersed image into desired spectral images, because the number of degrees of freedom ("voxels") in the required spectral cube matches the number of spatial features K multiplied by the number of wavelength bands S.

The required matches of spatial feature area A and feature-size $\Delta$ to respectively $S \cdot \delta x \cdot \delta y$ and $\Delta d$ can be implemented in two different ways: either as a rough feature object or, alternatively, as a blurred camera. For convenience of notation we characterize the object by its ideal image $\hat{I}_{l,m}^{(j)}$, which differs from the object itself in that it is scaled from real object dimensions to dimensions of images at the sensor plane. In this notation indices l,m correspond to two-dimensional (2D) Cartesian coordinates y and x of the image and index j corresponds to the wavelength band, $l=1, \ldots N_y$, $m=1, \ldots, N_x$, $j=1, \ldots, S$.

A. Rough feature object. This term relates to an object having an ideal image $\hat{I}_{l,m}^{(j)}$ which already has a rough featuresize $\Delta = \Delta d$. Such an object may be created in a computer by setting some groups of adjacent pixels to be identical, the adjacent pixels constituting a "macro-pixel" of S sensor pixels with a macro-pixel area of $A = S \cdot \delta x \cdot \delta y$. In this case, the non-dispersed image $I_{l,m}^{(j)}$ is equivalent to the ideal image. In one embodiment, the one-dimensional dispersion is along the x axis, and the macro-pixel includes S linearly arranged pixels of a row.

B. Blurred camera. This term relates to a blur introduced by either a small defocus or a programmed aberration, resulting in an engineered "blurred" point spread function (PSF) $h_{\Delta l, \Delta m}^{(j)}$ with roughly a width $\Delta = \Delta d$. Then, even an object characterized by an ideal image $\hat{I}_{l,m}^{(j)}$ with a fine feature-size gives a non-dispersed image $I_{l,m}^{(j)}$ with a rough featuresize $\Delta$, related to by convolution equation $$\hat{I}_{l,m}^{(j)} = \sum_{l'=0}^{N_y-1} \sum_{m'=0}^{N_x-1} h_{l-l',m-m'}^{(j)} \hat{I}_{l',m'}^{(j)} \qquad (2)$$

In this case, area $A=S \cdot \delta x \cdot \delta y$ of spatial feature $\Phi$ is created by the engineered blur.

The blur may be obtained either by adjustment of the camera lens to create intentional defocusing or by an engineered blurring optical element which introduces a programmed aberration in the imaging lens and consequently a blurred spot at the sensor plane. The blurring element may be mechanically combined with the disperser. The blurring element may be implemented as a weak spherical lens, a cylindrical lens, an aspherical lens with essentially non-radial-symmetrical surface(s), or as a beam shaper. The beam shaper may be refractive-type (see. e.g. D. L. Shealy, "Classical (non laser methods)" in: F. M. Dickey, and S. C. Holswade, *Laser beam shaping theory and technologies*, Marcel Dekker, Inc, New York, 2000, pp. 313-348) or diffractive-type (M. A. Golub, M. Duparre, E.-B. Kley, R. M. Kowarschik, B. Luedge, W. Rockstroh, and H. J. Fuchs, "New diffractive beam shaper generated with the aid of e-beam lithography, Opt. Eng., 35(5), 1996" pp. 1400-1406). In some embodiments, the defocus function may be predefined in the camera optical block by appropriate spatial distances or by installing the blurring element in a single "block" with the disperser. The blurred spot created by the beam shaper at the sensor plane from each image point can be made essentially rectangular, in order to have essentially equal weights in the spectral multiplexing. Moreover, the blurred spot can be made without side lobes, in order to have spectral multiplexing applied to only adjacent spatial features $\Phi$.

According to the present invention there is provided an imaging system for obtaining snapshot images of an object in a number of different wavelength bands S, comprising: an image sensor having a plurality of sensor pixels in a sensor plane; an optical block having a disperser, the disperser providing at the sensor plane a light dispersion with a complete lateral dispersive shift $\Delta d$ such that $\Delta d$ matches a featuresize $\Delta$ of a spatial feature $\Phi$ of a non-dispersed image of the object formed at the sensor plane; and a mechanism for extracting from the light dispersion spectral-spatial data that can be converted into S images of the object in, correspondingly, S different wavelength bands.

Preferably, the spatial feature $\Phi$ has an area A that matches a single sensor pixel area $\delta x \cdot \delta y$ multiplied by S.

Preferably, the disperser is one-dimensional.

Preferably, the disperser is fixed relative to the image sensor.

In some embodiments, spatial feature $\Phi$ is created by a defocus function of the system.

In some embodiments, spatial feature $\Phi$ is created by an optical blurring element included in the optical block.

In some embodiments, the sensor has orthogonally positioned rows and columns, and the dispersion is along a row direction, a column direction or a diagonal direction of the sensor.

In some embodiments, the disperser is a prism.

In some embodiments, the disperser is a weakly dispersing one-dimensional grating which provides a strong first diffraction order.

In some embodiments, the image sensor is monochromatic.

In some embodiments, the image sensor is used in monochrome mode.

According to the present invention there is provided a method for obtaining snapshot images of an object in a number of different wavelength bands S using a digital camera, the method comprising the steps of: adding a disperser to the digital camera; using the disperser to obtain, at a camera image sensor plane, a light dispersion with a complete lateral dispersive shift $\Delta d$ such that $\Delta d$ matches a featuresize $\Delta$ of a spatial feature $\Phi$ of a non-dispersed image of the object formed at the sensor plane; and extracting from the light dispersion spectral-spatial data that can be converted into S images of the object in, correspondingly, S different wavelength bands.

According to the present invention there is provided a spectral imaging system for spectrally imaging an object comprising: an optical block including an imaging component, a fixed one-dimensional disperser and a sensor having sensor pixels, wherein each sensor pixel receives multiplexed spectral information from at least two adjacent object points; and a mechanism for de-multiplexing and processing the multiplexed spectral information at each pixel into spectral-spatial data, whereby the camera functions as a spectral imager.

According to the present invention there is provided a spectral imaging system comprising: an imaging component for relaying electromagnetic energy from an object or scene; a fixed one-dimensional disperser disposed to receive energy from the lens and to disperse the energy in a predetermined spectral and spatial pattern; an area array sensor disposed to receive the predetermined spectral and spatial energy pattern and to form a snapshot spectral data cube; and means to convert the spectral data cube into spectral images.

According to the present invention there is provided a spectral imaging system for imaging an object or scene comprising: a dispersive lens; a sensor having pixels and positioned in a predetermined spatial relationship with the dispersive lens, wherein the dispersive lens provides, at a sensor plane, a one-dimensional light dispersion with a complete lateral light dispersive shift $\Delta d$ that is equal to an image featuresize $\Delta$; and means to extract spectral images from the light dispersion detected at the sensor plane.

According to the present invention there is provided a method for obtaining snapshot images of an object in a number of different wavelength bands S using a digital camera that has an image sensor with a plurality of sensor pixels at a sensor plane, the method comprising the steps of: at each sensor pixel, obtaining multiplexed spectral information originating from at least two different object points; de-multiplexing the spectral information to obtain a spatial-spectral data cube; and from the data cube, obtaining S images of the object in, correspondingly, S different wavelength bands.

According to the present invention there is provided a method for obtaining snapshot spectral images of an object with a digital camera having a lens and an image sensor with sensor pixels at a sensor plane, the method comprising the steps of: providing a fixed one-dimensional disperser in an optical path between the object and the image sensor, the disperser serving for dispersing a spectrum originating or reflected from the object, and, from the dispersed spectrum, obtaining a plurality S of spectral images of the object

BRIEF DESCRIPTION OF THE DRAWINGS

The invention is herein described, by way of example only, with reference to the accompanying drawings, wherein:

FIG. 15 shows a spectral imaging camera of the present invention implemented in a GI capsule;

FIG. 16 shows a spectral imaging camera of the present invention implemented in an endoscope;

FIG. 18A shows the monochrome multiplexed sensor image of a test RGB picture with macro-pixels received by a monochrome CCD camera;

FIG. 18B shows a graph of a row of FIG. 18A;

FIG. 19A shows a target de-multiplexed spectral image of the test RGB picture of FIG. 18 with macro-pixels;

FIG. 19B shows a reference spectrum of three types of inks, used for comparison with the spectral image of FIG. 19A;

FIG. 20 shows the structure of another RGB test object with macro-pixels;

FIG. 21 shows the structure of an additional reference RGB pattern with thin slit-like lines spaced at a macro-pixel wide pitch, which serves for calibration of the test RGB object of FIG. 20;

FIG. 25 shows the structure of a multiple-color 2D test picture with square macro-pixels;

FIG. 26 shows the structure of an additional reference 2D pattern with thin slit-like lines spaced at a macro-pixel wide pitch, which serves for calibration of the 2D test picture of FIG. 25;

DETAILED DESCRIPTION OF THE INVENTION

Figure 1:
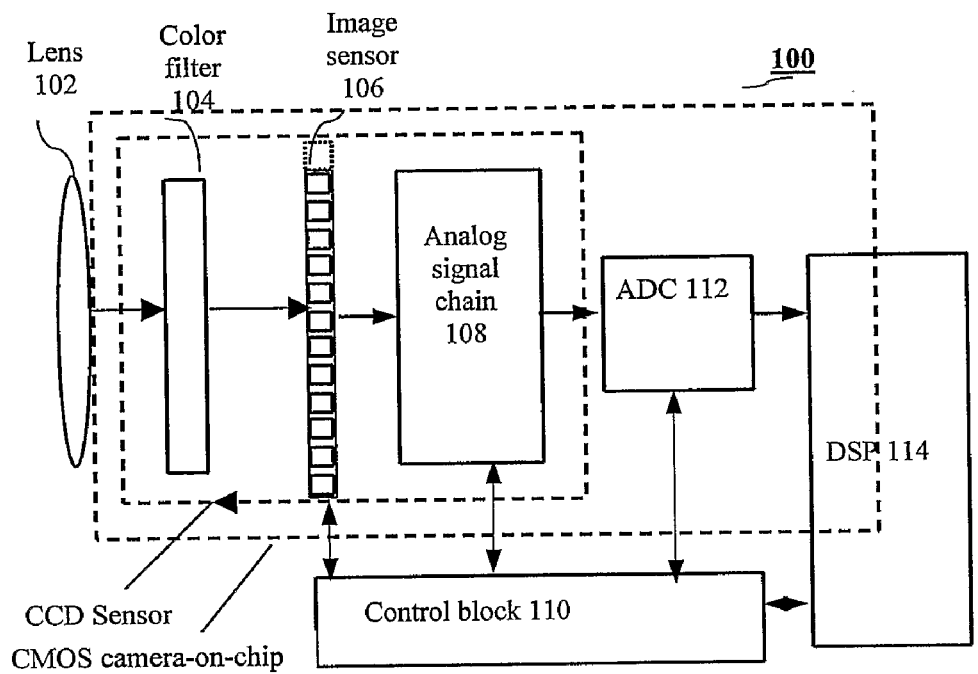
FIG. 1 shows a block diagram of a typical digital camera system (prior art)
Figure 2:
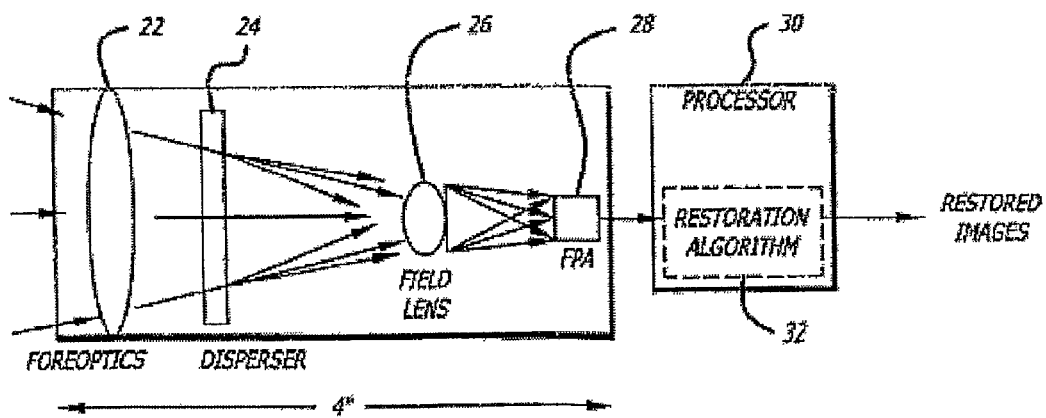
FIG. 2 shows a block diagram of a typical CTIS system (prior art)
Figure 3:
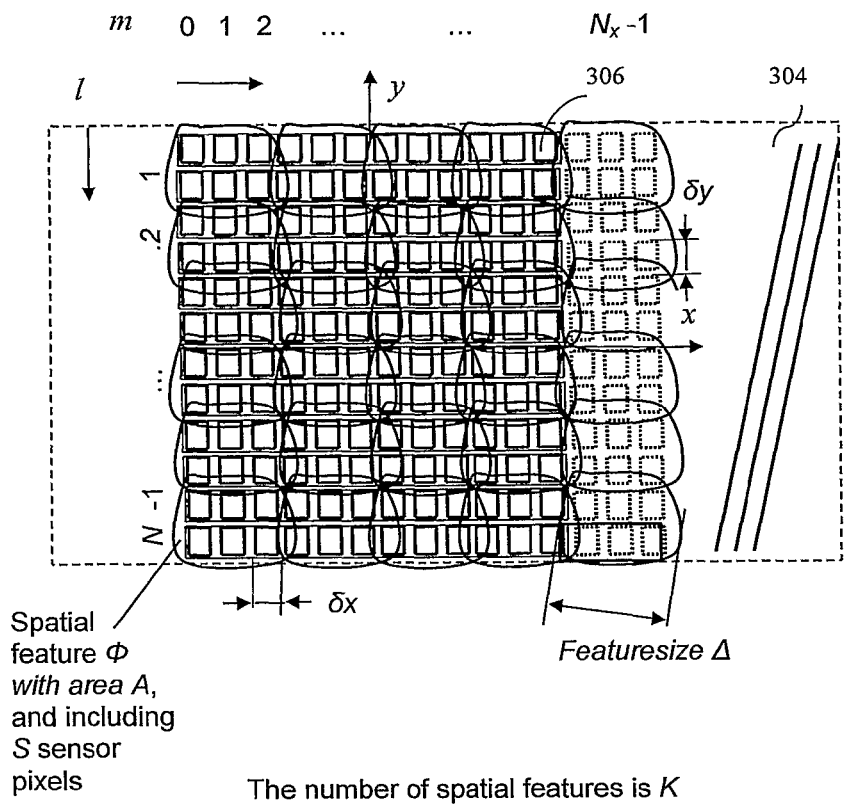
FIG. 3 identifies all the key features of a non-dispersed image: spatial feature Φ, area A and featuresize Δ.
Figure 4:
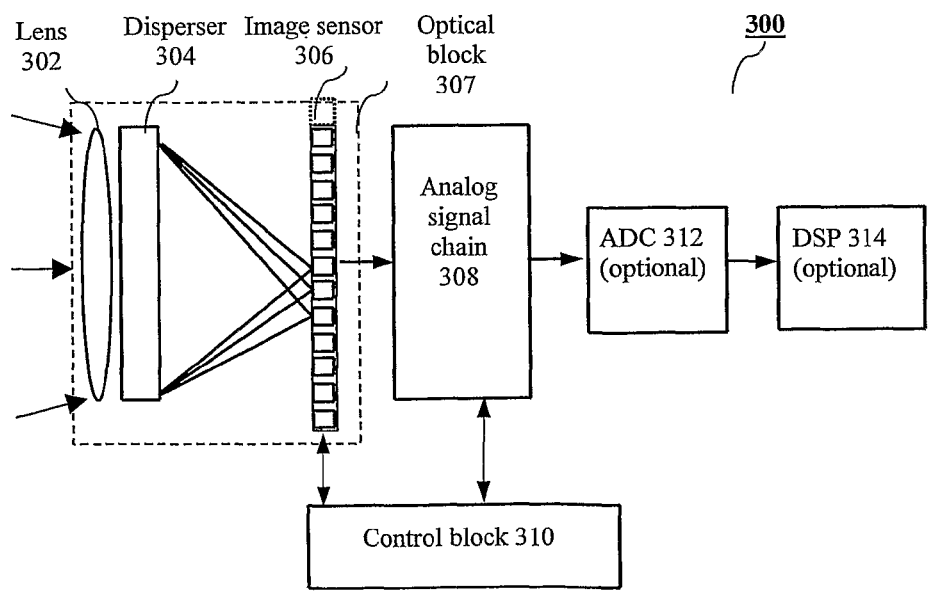
FIG. 4 shows a schematic block diagram of a spectral imaging camera of the present invention for a case of a rough feature object.

FIG. 4 shows a schematic block diagram of a SI camera 300 of the present invention in a "rough feature object" embodiment, in which the ideal image of the object has a featuresize Δ which is substantially larger than the sensor pixel pitch. Camera 300 comprises an imaging component (lens or mirror) 302 for relaying electromagnetic energy (photons) from an object or scene 301 (shown in FIG. 6), a disperser 304 disposed to receive energy from the imaging component and to disperse the energy in a predetermined spectral and spatial pattern and a sensor (area array detector) 306 disposed to receive the spectral and spatial energy pattern and to form a snapshot spectral data "cube". Hereinafter, the imaging component will be referred to simply as "lens". The data cube may be in analog or digital form. Elements 302, 304 and 306 form a basic optical block 307. For simplicity, the invention is described hereinafter with the lens being a single lens. In some embodiments, lens 302 and disperser 304 may be combined into a "dispersive lens" element, described in more detail in FIG. 11. In other embodiments, lens 302 may include a plurality of optical elements positioned separately from the disperser.

As in a regular digital camera, sensor 306 may be a CCD sensor, a passive, active or digital CMOS sensor, a FPA or a micro-bolometer image sensor. It may be monochromatic or RGB-type, and it may operate in various spectral ranges, from X-ray through visible to far infrared (FIR). It may have a rectangular shape, with an equal or non-equal number of pixels along axes x and y (see also FIGS. 7 and 8). The pixels need not be square. Image sensors that can be used in the SI cameras disclosed herein are manufactured by a host of manufacturers. A non-limiting example includes CCD and CMOS sensors manufactured by Hamamatsu Photonics K. K, Solid State Division, 1126-1, Ichino-cho, Hamamatsu City, 435-8558, Japan. These sensors cover a wide spectral response range and come in a wide variety of chip and pixel geometries and pixel size and pitch.

Figure 5:
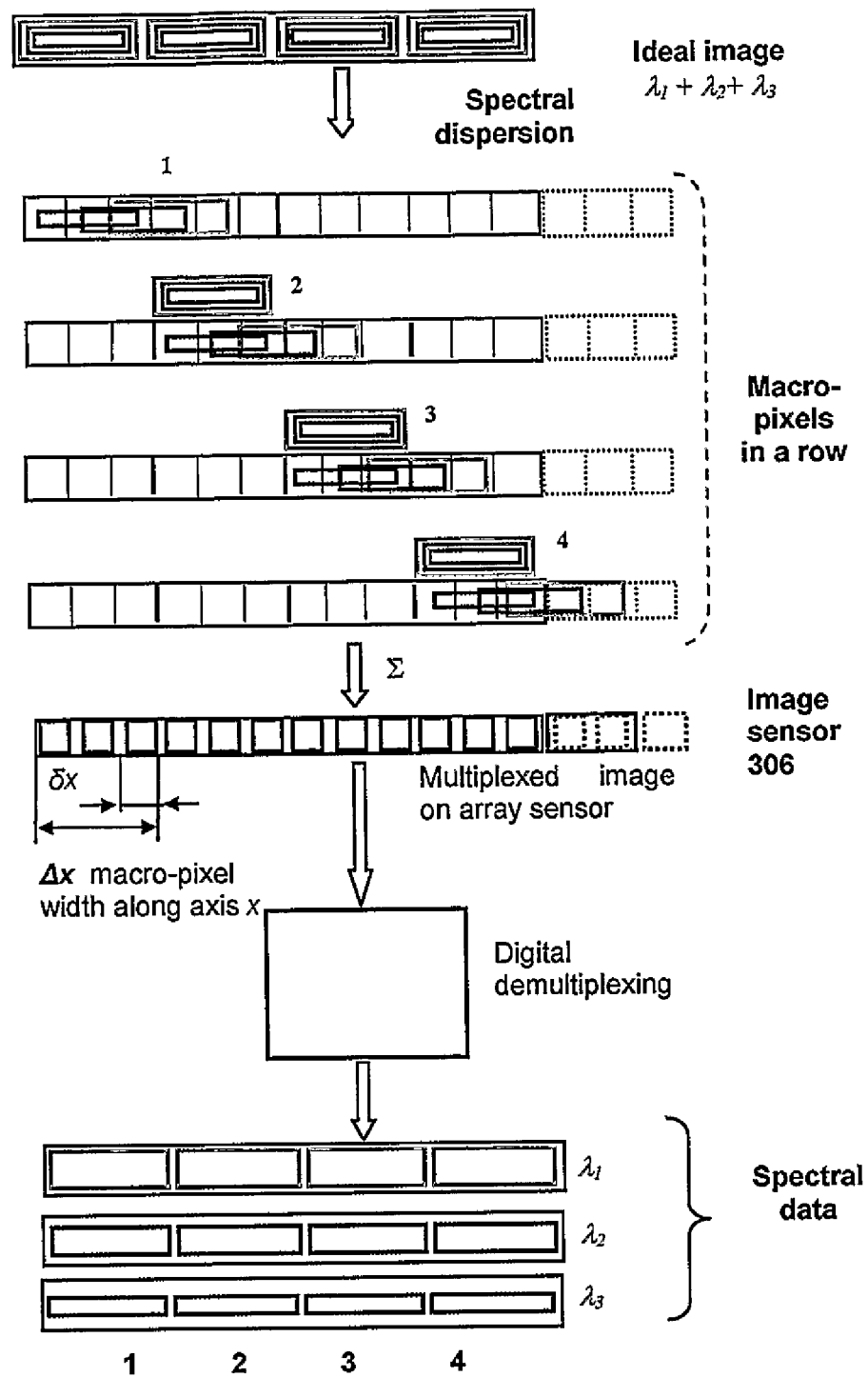
FIG. 5 shows an illustration of a spectrum multiplexing scheme in a spectral imaging camera of the present invention.
Figure 6:
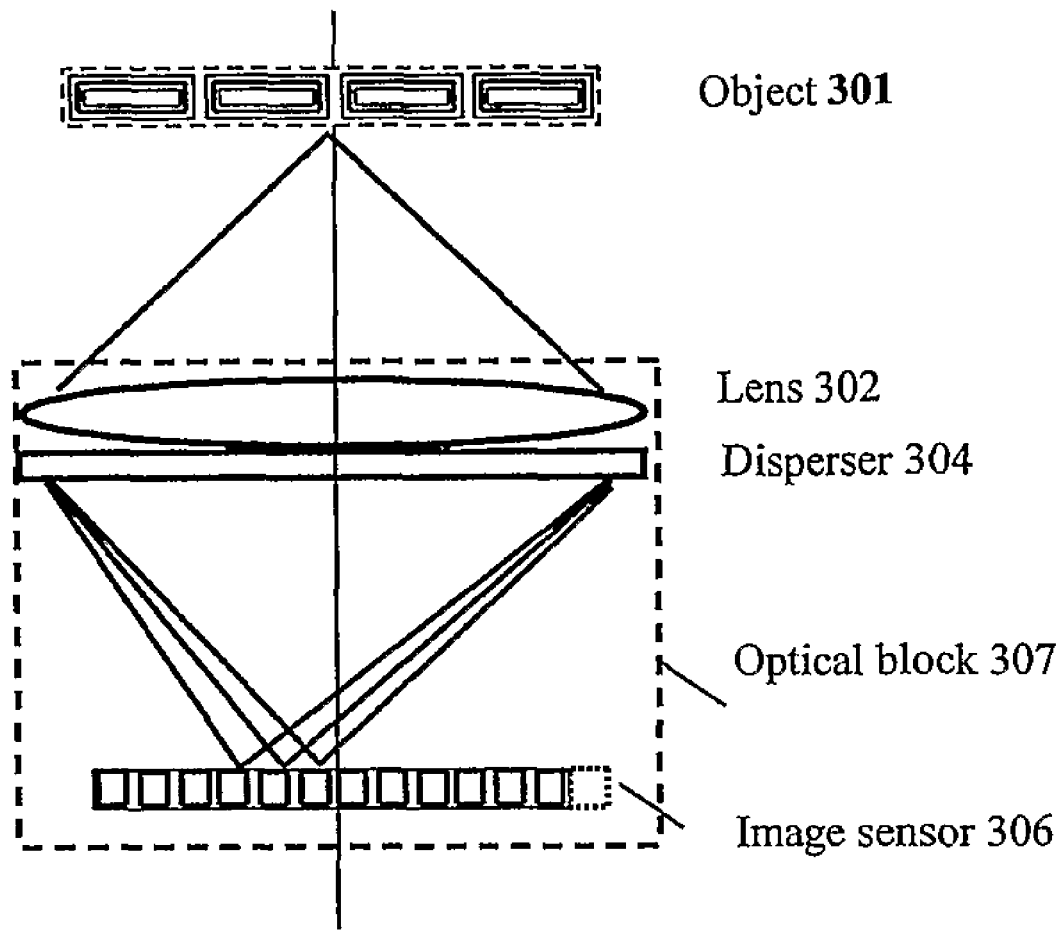
FIG. 6 shows an optical scheme of a spectral imaging camera of the present invention, using a grating as a disperser.

The spectral dispersion and sensing action are illustrated schematically in FIGS. 5 and 6, which depict the dispersed-induced spectral decomposition and subsequent light integration by the image sensor. The disperser decomposes the spectral components of the image and shifts them in accordance with wavelength. For simplicity, only three spectral bands S, marked $\lambda_1, \lambda_2, \lambda_3$, are shown. However, it should be clear that the method and explanation are applicable for any number of spectral bands (both multispectral and hyperspectral) in the spectral range of interest.

Disperser 304 is preferably a prism or a weakly dispersive diffraction grating element, the latter transmissive or reflective. Other known dispersers or combinations of dispersers may also be used for the purposes set forth herein. In fact, any element that provides at the sensor plane a dispersion so that the entire wavelength range essentially matches a spatial feature Φ should be considered as covered by the present invention. As a prism, its dispersion is naturally demonstrated in a single refracted beam in the entire spectral range and has a one-dimensional character (along a single axis, along either rows or columns of sensor pixels, as in FIG. 7, or along a diagonal of sensor pixels, as in FIG. 8). As a diffraction grating, in some particularly inventive embodiments, disperser 304 is "linear" or "one-dimensional" (acting along a single axis of sensor pixels) and provides essentially a first order diffraction pattern in a relatively narrow spectral range of interest. Specifically, the equation for the separation of the spectrum regions with the aid of a diffraction grating disperser is:

$$L\frac{\delta\lambda}{\Lambda} = \delta x, \qquad (3)$$

where L is the effective distance from the diffraction grating to the sensitive area of the sensor (the sensor plane), δλ is the width of a single spectral range of the spectral image, Λ is the grating period and δx is the sensor pixel pitch. In other embodiments, a diffraction grating may provide multiple diffraction orders, wherein each diffraction order possesses its own dispersion.

To better understand the uniquely inventive aspect of featuresize Δ, assume that the wavelength (spectral) range of interest extends from a wavelength $\lambda_{min}$ to a wavelength $\lambda_{max}$ and includes several (S) spectral bands. The disperser has a spectral response η(λ) and introduces a dispersive lateral shift $d(\lambda)=(d_x(\lambda),d_y(\lambda))$ on a wavelength λ relative to a reference wavelength $\lambda_0$ for which $d(\lambda_0)=0$. In particular, we may choose $\lambda_0=\lambda_{min}$, $\lambda_0=\lambda_{max}$ or $\lambda_0=(\lambda_{min}+\lambda_{max})/2$. Within the complete wavelength range Δλ, a complete lateral dispersive shift Δd is calculated as:

$$\Delta d = |d(\lambda_{max}) - d(\lambda_{min})|. \qquad (4)$$

We set Δd=Δ. Accordingly, the number of PD pixels (along the direction of the dispersion provided by the disperser) within featuresize Δ needs to match the number of wavelength bands S resolved in the spectral imaging arrangement.

Figure 7:
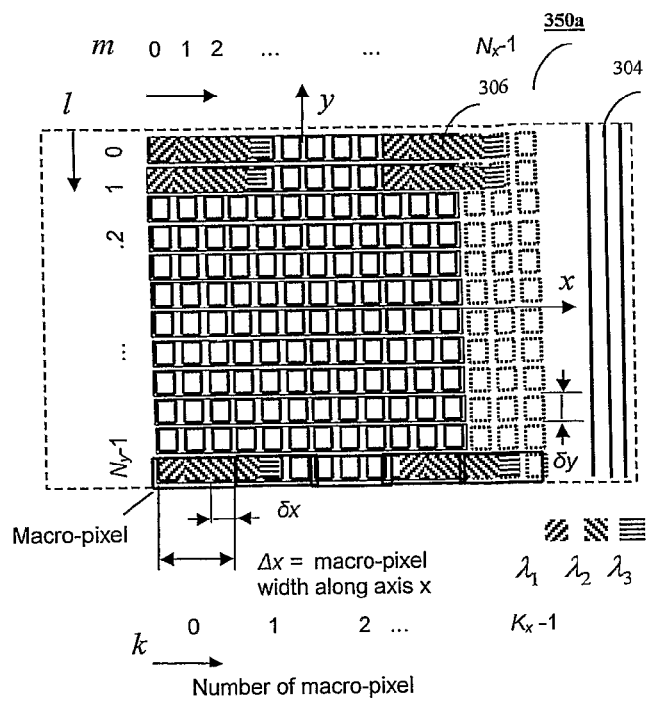
FIG. 7 shows a first disperser/sensor predetermined spatial arrangement.
Figure 8:
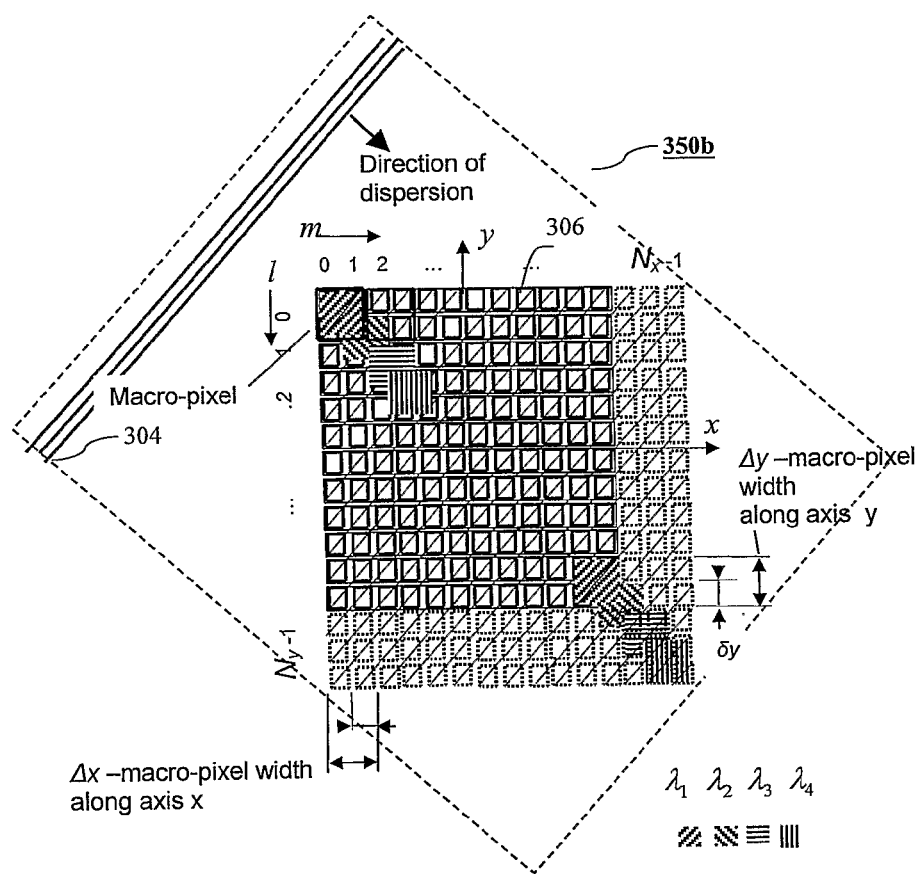
FIG. 8 shows a second first disperser/sensor predetermined spatial arrangement.

FIG. 7 shows a first disperser/image sensor predetermined spatial arrangement 350*a*, in which the spectrum is dispersed along sensor row pixels, where a "macro-pixel" in the x direction is a group of 3 sensor pixels, matching the dispersion shift within three spectral bands. The macro-pixel represents a particular example of a spatial feature Φ in the non-dispersed image. In particular, macro-pixels are created on a well-defined rectangular grid, without any intersection between adjacent macro-pixels in a non-dispersed image. In this example, area A matches the area of 3 sensor pixels and featuresize Δ matches the length of 3 sensor pixels along axis x. In FIG. 8, a macro-pixel includes 4 diagonal sensor pixels, matching a dispersion range of four spectral bands. Therefore, A matches the area of 4 sensor pixels and Δ matches the diagonal length. In both figures, R represents the number of sensor rows, C represents the number of sensor columns, l is a running number of a row, m is a running number of a column, l=1, ... $N_y$, m=1, ..., $N_x$, x, y are Cartesian coordinates in the image sensor plane, δx, δy are pixel pitches and Δx, Δy are macro-pixel pitches along axes x, y respectively. In general, R need not be equal to C. As mentioned, the actual number of bands S can be much larger than 3 (FIG. 7) or 4 (FIG. 8), and in particular can fit the definition of "hyperspectral" bands, commonly accepted to be 10 or more bands.

The overlap of the image pixels in FIG. 8 features a two-dimensional nature and involves overlap of both rows and columns. This embodiment gains from dealing directly with a 2D spectral image, at the expense of somewhat increased computational complexity in the process of spectral de-multiplexing. The predetermined disperser/image sensor spatial arrangement leads, at each sensor pixel, to spectral multiplexing of different spectra with different wavelengths originating from different respective object or scene points. Inventively, the dispersion range of the entire set of spectral bands extends within the width (featuresize) of a single macro-pixel. Accordingly, each sensor pixel receives from two adjacent macro-pixels of the ideal image light of different wavelengths.

FIGS. 4-8 showed the camera for a case of a "rough feature object", whereas the ideal image of the object already has (before non-dispersed imaging) a featuresize which is substantially larger than the sensor pixel pitch. Such an object may be created as a test object or alternatively by structured illumination of an essentially spatially invariant natural object. In order to fit our method to the case of a natural object with any featuresize in the ideal image, we need to enlarge the featuresize in parallel with the dispersion, by either an engineered blur or defocus action, as explained above.

Figure 9:
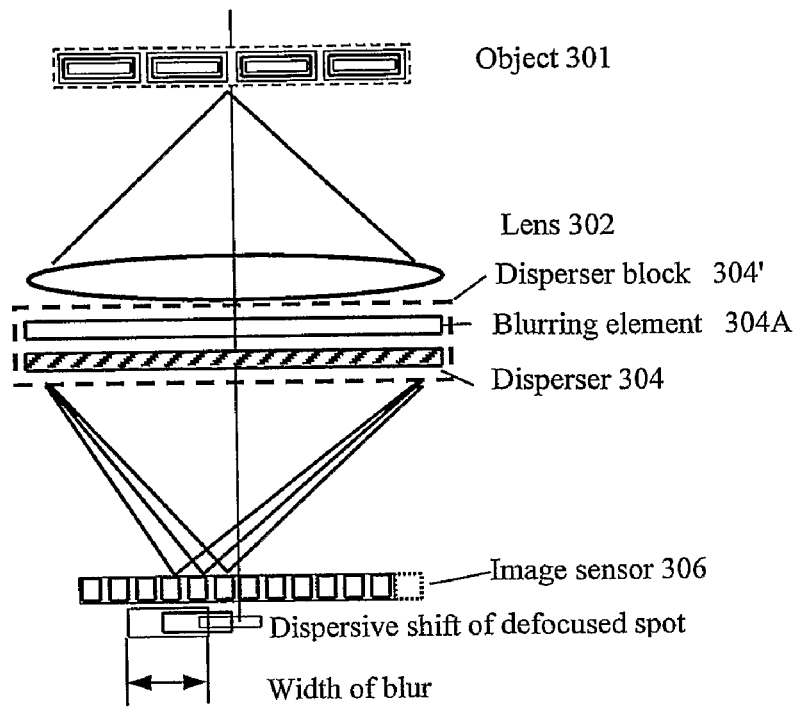
FIG. 9 shows a schematic block diagram of a spectral imaging camera of the present invention for a case in which an engineered blur is introduced by a blurring optical element.
Figure 10:
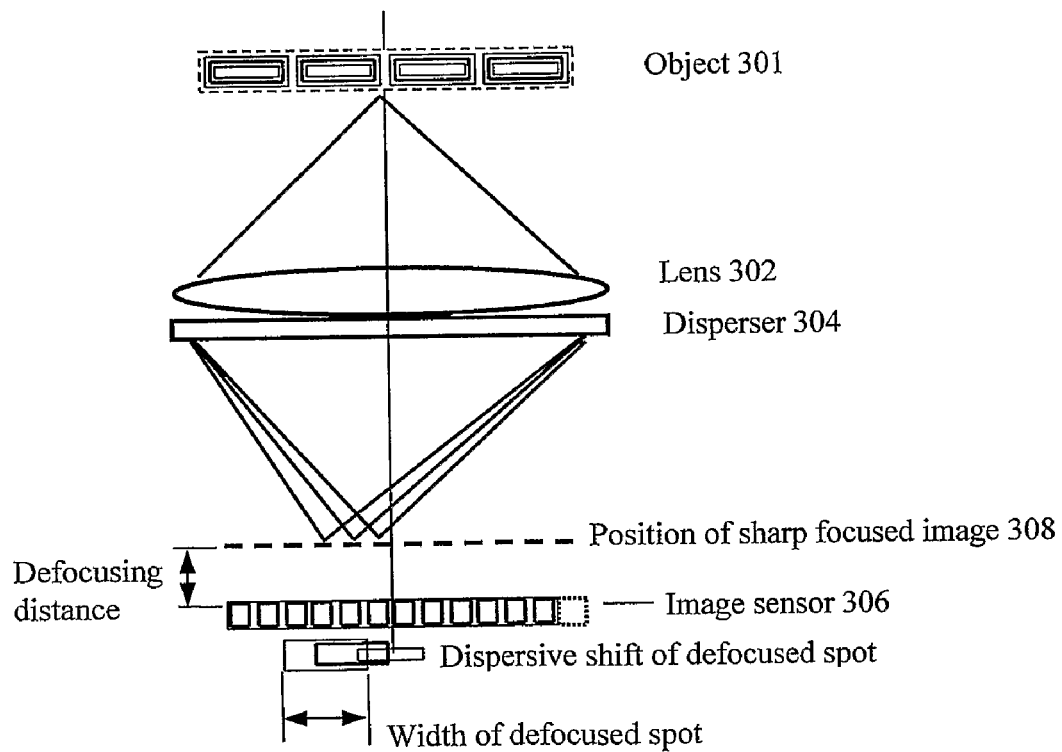
FIG. 10 shows a schematic block diagram of a spectral imaging camera of the present invention for a case in which the engineered blur is introduced by deviating a position of the image sensor from a focused image position.

FIG. 9 is a modification of FIG. 4, showing a camera embodiment in which the engineered blur is introduced by a blurring element 304A. As shown, element 304A is part of a disperser block 304', which also includes disperser 304. FIG. 10 is a modification of a FIG. 4, showing another camera embodiment in which the engineered blur is introduced by deviating the image sensor position array from a focused image position. The defocusing distance is chosen so as to have a defocusing spot in the ideal image matching the required featuresize.

Returning now to FIG. 4, in common with digital cameras, system 300 may further include (for a CCD, FPA or microbolometer sensor) an analog signal chain 308 for amplification and a control block 310 for controlling the functions of the image sensor and the analog signal chain. ACS 308 may include additional functionalities related to the spectral capability, and is therefore also referred to hereinbelow as analog preprocessing circuitry (APC). With an active CMOS imaging sensor, system 300 may (as in system 100) optionally further include an ADC 312 and a DSP 314, both coupled to the control block. The DSP may include de-multiplexer electronics and software. Some or all of the functions of elements 308-314 may be integrated with the detection functions of sensor 306 to provide a "spectral camera-on-chip" system. The integration of such functions on a single chip or substrate in digital cameras-on-chip is known and described for example in Fish. In some remote sensing applications and/or networked surveillance applications, system 300 may be further be coupled to a remote control unit (e.g. in FIG. 14) through well known communication means.

Unlike digital cameras, system 300 may totally lack color filters (except in embodiments in which the sensor comes already equipped with RGB filters). When such filters exist (e.g. incorporated in the imager chip), system 300 does not require their use. Unlike known snapshot SI imagers, system 300 has both a unique disperser and a unique disperser—sensor spatial relationship, leading to a simplified optical train and a simpler system design.

Disperser 304 is inventive in both structure and function, thereby providing an important and distinctive feature of system 300. In structure, the main differences vs. CTIS dispersers are as follows. as a prism, disperser 304 is fixed (non-rotating) relative to the optical axis and the sensor, in contrast with rotating prisms. As a diffraction grating, disperser 304 is one-dimensional, in contrast with CTIS dispersers, which are two-dimensional. In contrast with regular spectrometers, the one-dimensional dispersion shift over the entire wavelength range is herein substantially smaller than a non-dispersed object image dimension in the dispersion direction.

Unlike the snapshot SI imager disclosed in US patent application 20060072109, system 300 has no lenslet and/or pinhole array to divide a field of view into multiple channels, and therefore the disperser is not used to disperse channels into multiple spectral signatures. In embodiments in which disperser 304 is a multiple-order diffraction grating, the dispersive power of the grating, integrated over all the spectral bands, is arranged to match the featuresize of the image that would be formed on the image sensor before installation of the diffraction grating.

Spectral Data Acquisition

In use, an object is imaged through the camera lens and disperser (or a disperser block with optional blurring element) onto the image sensor. The object is described, in our notations, by its ideal 2D image for each spectral band, which is an intensity function of 2D Cartesian coordinates. The pixels of the non-dispersed 2D image are defined as $I_{l,m}^{(j)}$, where indices l,m correspond to 2D Cartesian coordinates of the image and index j corresponds to the wavelength band, $l=1, \ldots, N_y, m=1, \ldots, N_x, j=1, \ldots, S$. Pixels $I_{l,m}^{(j)}$ are only a mathematical description and define a spectral cube, corresponding to the object. Note that in regular (non-spectral) imaging without a disperser (as in regular digital camera imaging), a monochromatic image sensor (or a RGB mosaic filtered sensor set-up in a monochromatic mode) detects at each pixel an image intensity $I_{l,m}$ which is integrated over all spectral bands, as $$I_{l,m} = \sum_{j=0}^{S-1} p^{(j)} I_{l,m}^{(j)} \quad (5)$$

where $p^{(j)}$ is the spectral sensitivity of the image sensor. Consequently, in regular imaging with a monochromatic (or RGB filtered) sensor, the detailed spectral data is lost.

In contrast, in the present invention, we create, instead of non-dispersed image intensity pixels, "dispersed" pixels $J_{l,m}^{(j)}$ which are spectrally dispersed and optionally blurred or defocused by the disperser or disperser block. The dispersed pixels are described by equation:

$$J_{l,m}^{(j)} = \eta^{(j)} I_{l-d_y^{(j)}, m-d_x^{(j)}}^{(j)} \quad (6)$$

where $d_x^{(j)}, d_y^{(j)}$ are respectively the projections along axes x, y, of the spectral shift at a wavelength band number j and $\eta^{(j)}$ is an efficiency of the disperser as a function of j. The sensor detects at each of its pixels a multiplexed intensity $J_{l,m}$ integrated over all spectral bands, as $$J_{l,m} = \sum_{j=0}^{S-1} p^{(j)} J_{l,m}^{(j)} = \sum_{j=0}^{S-1} p^{(j)} \eta^{(j)} I_{l-d_y^{(j)}, m-d_x^{(j)}}^{(j)}. \quad (7)$$

The multiplexed intensity at each sensor pixel thus contains information about the non-dispersed image in spectrally multiplexed form. Therefore, in the systems and methods of the present invention, the spectral data is retained.

To emphasize, after spectral decomposition by the disperser, spectral components of the non-dispersed image pixel are located at different positions and with different linear coordinates on the sensor. The spectral multiplexing is caused by overlap of the spectral components of different image pixels entering the same position on the sensor after the spectral decomposition. The sensor, which has a wide spectral sensitivity, summarizes contributions of all the wavelength bands at each of its pixels to form a spectrally multiplexed image. The set of image pixels in the spectrally multiplexed image on the sensor contains all the information about the original spectrum of the non-dispersed image pixels. The spectrally multiplexed image from the image sensor is then transferred to a digital processor (such as DSP 314). In some embodiments, the DSP function may be performed on the sensor chip itself. The digital data processing enables de-multiplexing of the spectrally multiplexed intensity pixels $J_{l,m}$ in order to obtain directly the pixels $I_{l,m}^{(j)}$ of the non-dispersed image, which is related to $J_{l,m}$ in accordance with Eq. (7). That is, the digital processing finalizes the separation of spectral ranges and restores the series of spectral images of the object, i.e. provides full image data in each separate spectral band. Note that the actual result of the de-multiplexing is a set of K values assigned to the spatial features Φ for each spectral band, where the set of K values characterizes the pixels of an entire non-dispersed image $I_{l,m}^{(j)}$ for each wavelength band j. Accordingly the set of K·S values characterizes the pixels of an entire non-dispersed image $I_{l,m}^{(j)}$ for all S wavelength bands.

Exemplary De-Multiplexing Procedure

The next section teaches an exemplary de-multiplexing procedure, a key enabling feature of this invention. Mathematical equations are written for a one-dimensional model which deals with a single representative row of each two-dimensional image (ideal, non-dispersed, multiplexed and de-multiplexed). An extension to a two-dimensional model includes a straightforward application of the equations sequentially to every row, as would be clear to one skilled in the art. In fact, experimental results were obtained and are presented on two-dimensional object images (FIGS. 25-29). If we have $N=N_x \cdot N_y$ sensor pixels and want to obtain S wavelength bands in the spectral representation, the number of spatial features (or more specifically macro-pixels) of the non-dispersed image in a single row $K_x$ becomes $$K_x = N_x/S, \quad (8)$$

so that total number of spatial features (macro-pixels) of the entire non-dispersed image is $$K = K_y \cdot N_y \quad (9)$$

N may be equal to either the number of rows $N_y$ or to the number of columns $N_x$ in the image sensor. The spatial feature Φ is in this case a macro-pixel, i.e. a group of $1 \times N_x$ pixels in a row. The single intensity value assigned to each spatial features Φ for each spectral band is, specifically in this case, a common value of intensity, shared by all $1 \times N_x$ pixels for each spectral band.

Let us denote the values of the spectral intensity distribution of the non-dispersed image of macro-pixels before spectral as $I_{\Phi k_x}^{(j)}$, $k_x=1, \ldots K_x$, $j=1, \ldots, S$, where i is the number of the macro-pixel and j is the number of the wavelength range. Therefore, the intensities are essentially the same for all the sensor pixels, which are members of the same feature (macro-pixel $1 \times N_x$). Consequently, the light power integrated within a uniform macro-pixel of $1 \times N_x$ is $S \cdot I_{\Phi k_x}^{(j)}$.

In order to write mathematical equations, we define a vector $I=\{Is_m\}$, $m=1, \ldots, N_x$, $N_x=K_x \cdot S$ which includes the spectral intensity components $I_{\Phi k_x}^{(j)}$ ordered first in the sequence of wavelengths (i.e. j) and then in the order of image macro-pixel numbers i, as $$Is_{N_w(k_x-1)+j} = I_{\Phi k_x}^{(j)}, k_x=1, \ldots K_x, j=1, \ldots, S \tag{10}$$

We also define a vector of the image sensor pixels in each sensor row $J=\{J_m\}$, $m=1, \ldots, N_x$, which is composed of components defined above in Eq. (7) for a fixed l. An assumption for specific mathematical equations in this embodiment is that the intensity distribution in the ideal image inside the macro-pixel is uniform for each and every wavelength range. This assumption may be relaxed, leading to changes in the equations which are well understood by those skilled in the art. Under the assumption above, the light intensity distribution after the spectral decomposition and subsequent light integration by the image sensor (see FIG. 5), features an image inter-pixel cross-talk, described by a set of equations, as $$J_{S(k_x-1)+j} = \sum_{n=1}^{j} I_{\Phi k_x}^{(n)} + \sum_{n=j+1}^{S} I_{\Phi k_x-1}^{(n)}, \tag{11}$$

$$k_x = 1, \ldots K, j = 1, \ldots, S$$

where the image pixels with index out-of-range are assumed to be zeros, and the sums with inverse limits are also assumed to be zeros. Equation (9) defines the overlap between adjacent image pixels, created for optical encoding of the spectral information in such a form that may be sensed by a standard image sensor.

$$J = MI + N_d \tag{12}$$

where matrix M is just a multi-diagonal matrix with S times repeated number "1" in each string, and $N_d$ is noise. Equation (12) describes the multiplexing in our invention. Equation (11) shows that the multiplexing is actually a convolution of I with a macro-pixel width, resulting in J. Accordingly, "de-multiplexing" means a procedure for deconvolution. For an invertible matrix M and negligible noise level, we can find a first approximation to the de-multiplexing solution as:

$$I = M^{-1} J \tag{13}$$

To illustrate how the de-multiplexing algorithm is applied in the case of low noise level, assume $N_x=12$, $S=3$ and accordingly $K_x=4$ pixels. The beginning of the sequence $Is_1, Is_2, Is_3, Is_4, Is_5, Is_6, \ldots$ is $I_1^{(1)}, I_1^{(2)}, I_1^{(3)}, I_2^{(1)}, I_2^{(2)}, I_2^{(3)}, \ldots$. The matrix M becomes tri-diagonal:

$$M = \begin{pmatrix} 1 & 0 & 0 & 0 & 0 & 0 & 0 & 0 & 0 & 0 & 0 & 0 \\ 1 & 1 & 0 & 0 & 0 & 0 & 0 & 0 & 0 & 0 & 0 & 0 \\ 1 & 1 & 1 & 0 & 0 & 0 & 0 & 0 & 0 & 0 & 0 & 0 \\ 0 & 1 & 1 & 1 & 0 & 0 & 0 & 0 & 0 & 0 & 0 & 0 \\ 0 & 0 & 1 & 1 & 1 & 0 & 0 & 0 & 0 & 0 & 0 & 0 \\ 0 & 0 & 0 & 1 & 1 & 1 & 0 & 0 & 0 & 0 & 0 & 0 \\ 0 & 0 & 0 & 0 & 1 & 1 & 1 & 0 & 0 & 0 & 0 & 0 \\ 0 & 0 & 0 & 0 & 0 & 1 & 1 & 1 & 0 & 0 & 0 & 0 \\ 0 & 0 & 0 & 0 & 0 & 0 & 1 & 1 & 1 & 0 & 0 & 0 \\ 0 & 0 & 0 & 0 & 0 & 0 & 0 & 1 & 1 & 1 & 0 & 0 \\ 0 & 0 & 0 & 0 & 0 & 0 & 0 & 0 & 1 & 1 & 1 & 0 \\ 0 & 0 & 0 & 0 & 0 & 0 & 0 & 0 & 0 & 1 & 1 & 1 \end{pmatrix}$$

and is obviously invertible, with an inverse matrix $$M^{-1} = \begin{pmatrix} 1 & 0 & 0 & 0 & 0 & 0 & 0 & 0 & 0 & 0 & 0 & 0 \\ -1 & 1 & 0 & 0 & 0 & 0 & 0 & 0 & 0 & 0 & 0 & 0 \\ 0 & -1 & 1 & 0 & 0 & 0 & 0 & 0 & 0 & 0 & 0 & 0 \\ 1 & 0 & -1 & 1 & 0 & 0 & 0 & 0 & 0 & 0 & 0 & 0 \\ -1 & 1 & 0 & -1 & 1 & 0 & 0 & 0 & 0 & 0 & 0 & 0 \\ 0 & -1 & 1 & 0 & -1 & 1 & 0 & 0 & 0 & 0 & 0 & 0 \\ 1 & 0 & -1 & 1 & 0 & -1 & 1 & 0 & 0 & 0 & 0 & 0 \\ -1 & 1 & 0 & -1 & 1 & 0 & -1 & 1 & 0 & 0 & 0 & 0 \\ 0 & -1 & 1 & 0 & -1 & 1 & 0 & -1 & 1 & 0 & 0 & 0 \\ 1 & 0 & -1 & 1 & 0 & -1 & 1 & 0 & -1 & 1 & 0 & 0 \\ -1 & 1 & 0 & -1 & 1 & 0 & -1 & 1 & 0 & -1 & 1 & 0 \\ 0 & -1 & 1 & 0 & -1 & 1 & 0 & -1 & 1 & 0 & -1 & 1 \end{pmatrix}$$

Therefore we can find $I = M^{-1}J$ and the spectral image rows $I^{(j)}=\{Is_{k_x}^{(j)}\}$, $k_x=1, \ldots K$, $j=1, \ldots, S$ are then obtained from de-multiplexed vector I by simply re-arranging the sequence of its components so that we get first all the values corresponding to a first wavelength band, then those corresponding to a second wavelength band, etc. Applying the entire procedure for each row of a 2D sensor image with low noise level yields a 2D spectral image, for each of the S wavelength bands.

To account for the effects of noise, we use a generic algorithm for spectral data reconstruction in the presence of noise, as defined by the model of measurements in the form of Eq. (12). A number of such algorithms are known, for example L. A. Shepp and Y. Vardi, "Maximum likelihood reconstruction for emission tomography," IEEE Trans. Med. Imaging MI-1, 2, 113-122, 1982 (hereinafter "Shepp and Vardi"); A. Lent, "A convergence algorithm for maximum entropy image restoration," in Image Analysis and Evaluation, SPSE Conference Proceedings, Rodney Shaw, Ed., pp. 249-257, 1976 and R. Gordon, R. Bender, and G. T. Herman, "Algebraic reconstruction techniques for three-dimensional electron microscopy and X-ray photography," J. Theor. Biol. 29, p. 471-481, 1970. One of the algorithms is an expectation-maximization (EM) algorithm, described by iterative equation $$\hat{I}_n^{(k+1)} = \frac{\hat{I}s_n^{(k)}}{\sum_{m'=1}^{N_x} M_{m',n}} \sum_{m=1}^{N_x} M_{m,n} \frac{J_m}{(MI^{(k)})_m}, \quad (14)$$

where k denotes a number of the iteration and $MI^{(k)}$ means multiplication of matrix and vector. Another algorithm that can be used is the alternative multiplicative algebraic reconstruction technique (MART) described by iterative equation $$\hat{I}_n^{(K+1)} = \left(\frac{M^T J}{M^T M I^{(k)}}\right) \hat{I}s_n^{(k)}, \quad (15)$$

where k denotes the number of the iteration. Still another algorithm (paper titled "Spline-based deconvolution" by Amir Averbuch and Valery Zheludev, submitted for publication in IEEE Transactions on Information Theory, hereinafter "Averbuch and Zheludev") builds a deconvolution procedure based on a spline approximation with an approximation accuracy and a smoothness parameter weighted in an approximation criterion.

After de-multiplexing, the separated spectral images for each spectral band j spectral vectors $I^{(j)} = \{I_{k_x}^{(j)}\}$, $k_x = 1, \ldots K_x$, $j = 1, \ldots, S$ are obtained from the vector I by simply rearranging the sequence of ordering in its components. Both vectors I and $I^{(j)}$ refer to a single row of the 2D image. The 2D separated spectral images for each spectral band j may be obtained by a straightforward application of the equations sequentially to every row, followed by merging of vectors $I^{(j)}$ of all the rows. The latter completes the algorithm of finding the spectral solution from the spectrally multiplexed measured data.

Hardware Configurations

Figure 11:
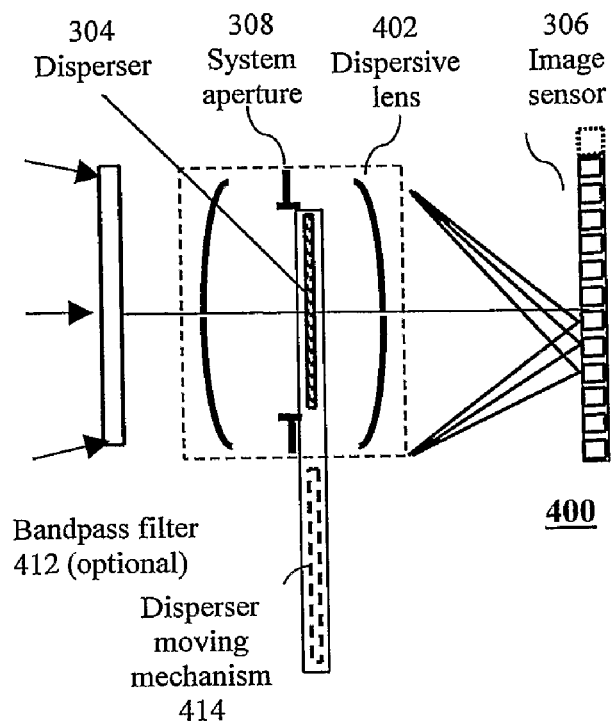
FIG. 11 shows a schematic block diagram of another spectral imaging camera of the present invention having an optical block with a removable external prism as disperser.
Figure 12:
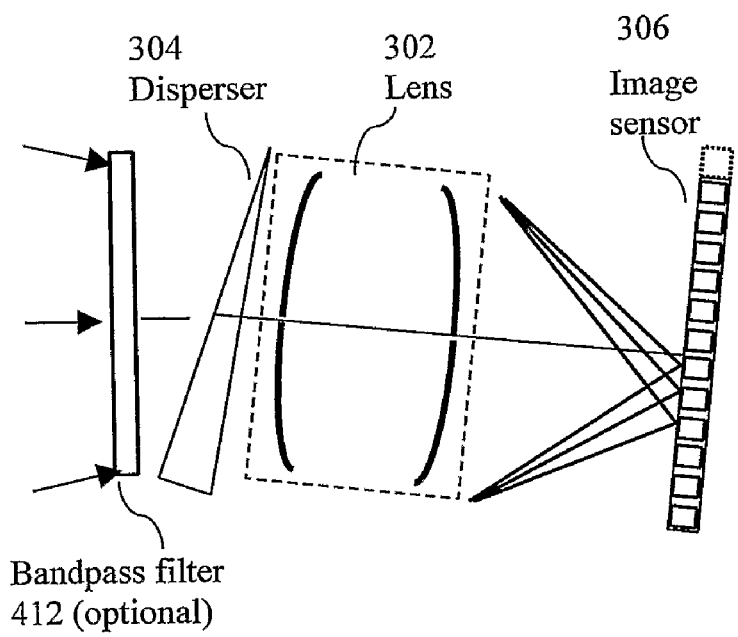
FIG. 12 shows a schematic block diagram of another spectral imaging camera of the present invention having an optical block with a removable diffraction grating at the system aperture as disperser.
Figure 13:
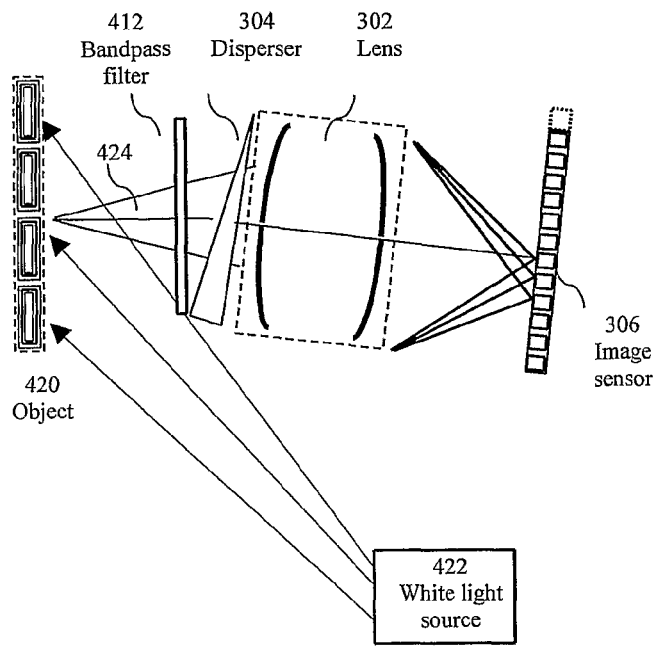
FIG. 13 shows a schematic block diagram of another spectral imaging camera of the present invention having a removable dispersive lens for spectral imaging of reflective objects.

FIG. 11 shows a schematic block diagram of another spectral camera of the present invention, which has an optical block with a removable external prism as disperser. FIG. 12 shows a schematic block diagram of yet another spectral camera of the present invention, which has an optical block with a removable diffraction grating at an system aperture position as a disperser. FIG. 13 shows a schematic block diagram of yet another spectral camera of the present invention, which has a removable dispersive lens for spectral imaging of reflective objects. In all three figures, a camera 400 includes a lens 302 and a sensor 306. In FIG. 11, the lens is a dispersive lens, i.e. it includes a subassembly of a disperser 304 and lens components 410. Disperser 304 is preferably placed at an system aperture plane 408 of the system. Such a placement allows the disperser to function in an essentially plane light-wave mode, which minimizes inherent aberrations and improves image quality. The design of the component lenses is matched with the light dispersing properties of the disperser. The disperser may be inserted into and removed from the optical path by an optional disperser moving mechanism 414. This allows the camera to have a dual-use, as both a regular digital camera and as a spectral camera. The insertion/removal may be performed mechanically or electrically. In some embodiments, when the disperser is a prism, the change in function (between dispersion and non-dispersion) may be done without actual physical movement of the prism, for example by activating a liquid crystal in front of the prism. Such a dual-use spectral camera may be particularly advantageous in mass consumer applications.

In use, an object 420 is illuminated with white light from a source 422, which be any known white light source. The light is reflected from the object (or alternatively a scene), and the reflected light enters the SI camera along an optical path 424. An optional band-pass filter 412 may be used in some embodiments to filter unwanted sections of the spectrum. The light is dispersed by the disperser, projected on and multiplexed at the image sensor as described above. The multiplexed spectrum is then de-multiplexed further to obtain a spectral-spatial data cube. The data cube is then further processed to obtain the necessary separate spectral and spatial information.

Figure 14:
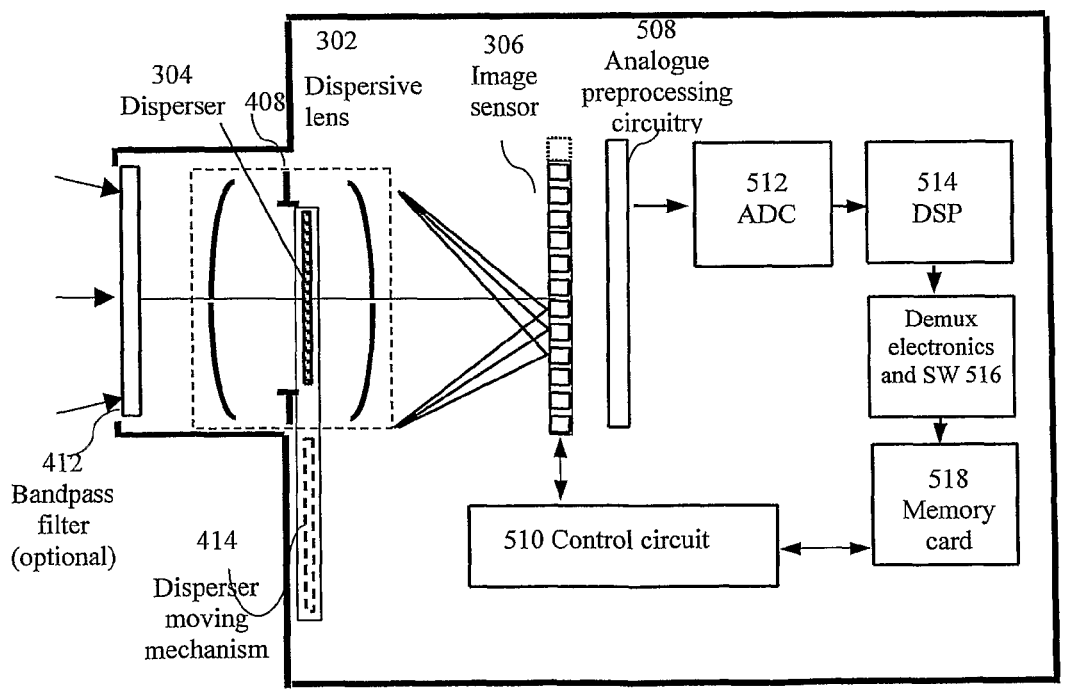
FIG. 14 shows a dual-use spectral imaging camera of the present invention.

A more detailed view of a dual-use camera 500 is given in FIG. 14. Camera 500 includes elements identical with those in FIG. 4 and numbered identically and in addition analog preprocessing circuitry 508, an ADC 512, a DSP 514, demultiplexing electronics and software (SW) 516, a memory card 518 and a control circuit 520. APC 508, ADC 512, DSP 514 and control circuit 510 have similar functions to blocks 308, 312, 314 and 310 respectively in FIG. 4. DEMUX 516 includes the necessary circuitry and algorithms to de-multiplex the spectra obtained by the sensor, and the memory card (as in regular digital cameras) is used to store images and spectral data. Note that some of the components listed above may be optional (as in FIG. 4) and some may be combined with others, for example in the same integrated circuit.

The simplicity of the system described above makes it particularly attractive for miniaturization. In one embodiment requiring extreme miniaturization, system 300 may be implemented in a GI capsule 600 (FIG. 15) or an endoscope 700 (FIG. 16). In both cases, a miniaturized SI camera including the optical block is incorporated in the GI capsule or the endoscope. In these embodiments, note the particular advantage of the simplicity of the optical setup—essentially the addition of a fixed disperser on the imaging path to the sensor. Even restricted spaces such as in a GI capsule or a distal end or distal side surface of an endoscope are large enough to accommodate the necessary physical elements in order to turn a regular imager into a SI imager. The SI data acquired by the image sensor is then relayed by a RF transmitter 602 (FIG. 15) or an adapter 702 and optical fiber 706 (FIG. 16) to an external control block. The external block includes respective receiving means (i.e. an RF receiver 606 in FIG. 15) and other functionalities as in camera 500, i.e. analog preprocessing circuitry 508, ADC 512, DSP 514, DEMUX 516, memory card 518 and control circuit 520 as in FIG. 14. The powering of various functions inside the capsule or endoscope is provided by respective power supplies 604 or 704, for example a battery or inductive means. Various types of data transmission to and from a GI capsule and an endoscope are known and may also be used with systems 600 and 700.

Figure 17:
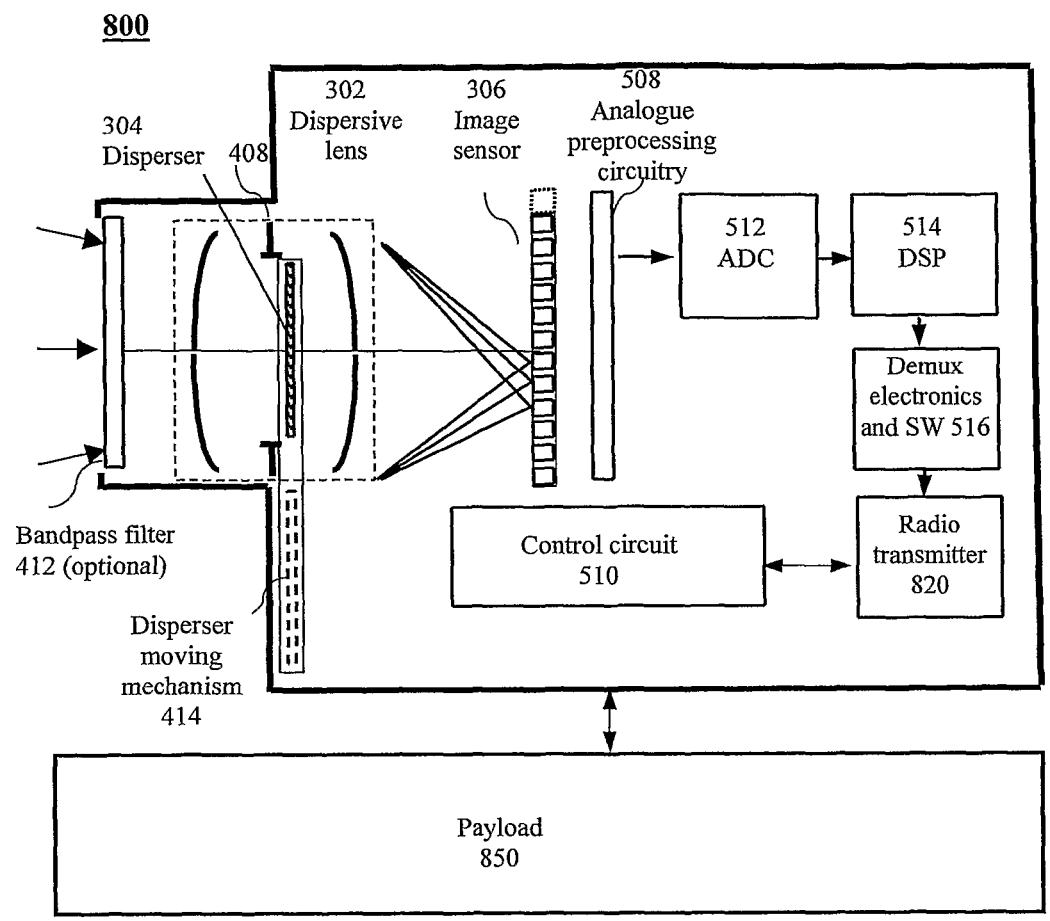
FIG. 17 shows a spectral imaging camera of the present invention implemented in a miniaturized airborne or satellite-born camera.

In yet another embodiment, system 300 may be implemented in a miniaturized airborne or satellite-born camera 800 (FIG. 17). System 800 includes all of the components of camera 500, except that a transmitter 820 is used to relay the acquired data to a remote receiver, in which case a memory card like card 518 may not be needed. In addition, the camera is coupled to a payload 850. It will be obvious to those skilled in the art that the range of implementations of system 300 in various types of cameras is practically unlimited, and that the shapes, sizes and functions for each particular implementation will mainly be a result of design choices.

In yet other embodiments, a digital camera of the present invention may be implemented in, or be attached to a cell-phone or other wireless communication device (e.g. a PDA), providing a spectral imager in the cell-phone or wireless communication device. Incorporation of digital cameras in cell-phones is well known in the art, see for example US patent Application 2006/0146140 by Kennedy.

Comparison with CTIS Imagers

In contrast with CTIS imagers, the SI cameras of the present invention have relatively simple lens systems, do not have a field stop and do not require intermediate image formation. In CTIS imagers, images at different wavelengths essentially do not overlap, due to the action of the (always included) a field stop and separation of disperser diffraction orders. Therefore, in CTIS spectral multiplexing occurs only at some of the sensor pixels, mainly at the edges of multiplexed images. In the present invention, images at different wavelengths overlap within adjacent spatial features Φ at all of the sensor pixels. Most significantly, in CTIS imagers, there is no entity equivalent to spatial feature Φ.

Note that in principle, in any image sensor, some (of the millions of) sensor pixels may be defective or masked intentionally, or the disperser may be designed such that some pixel rows, columns or diagonals are skipped (do not receive spectrally multiplexed radiation). In this case, the methods and systems disclosed herein will still perform their objective of providing snapshot spectral images, albeit less efficiently. Therefore, it should be clearly understood that as used herein, "per pixel" spectral multiplexing and de-multiplexing refers also to cases in which only some pixel columns, rows or diagonals are used for spectral multiplexing/de-multiplexing involving spatial features Φ.

In comparison with U.S. Pat. No. 6,522,403 (Wilson et al) and U.S. Pat. No. 7,092,088 (Schau), the SI cameras disclosed herein do not include a computer generated hologram disperser, a field stop or mirrors. Instead, the SI cameras of the present invention include a disperser with essentially a single output dispersed beam, i.e. a dispersive prism, a wedge prism or a diffraction grating with a strong first diffraction order. When an SI camera of the present invention uses a disperser with several diffraction orders, the dispersion is matched with a featuresize of the image in a predetermined spatial arrangement. In comparison with US patent application no. 20030133109 by Murguia, the SI cameras disclosed herein do not include a rotating prism, a field stop or a telescope.

Experimental Results

The snapshot spectral imaging method was verified and its concept proved experimentally in three experiments with different image sensors, one of a monochrome digital CCD camera, and the second of a commercial digital camera. All three experiments included spectral imaging of test rough-feature images in accordance with this invention and subsequent comparison of the results with reference data obtained from additional "reference" pictures, which had thin slit-like lines spaced at a macro-pixel width pitch. These reference pictures do not incur either overlap or multiplexing of the spectrum from different pixels because the lines have a sufficiently spaced pitch. Therefore, for the reference pictures, the optical arrangement of FIGS. 12, 13 serves as a simple multichannel prism spectrometer, featuring however several channels in a quantity equal to the number of macro-pixels. Note that images of a real object do not allow use of additional "reference" pictures containing thin slit-like lines spaced at the macro-pixel wide pitch. However, the test and calibration procedures described below are based on parallel use of macro-pixel wide squares or strips and thin slit-like lines spaced at the macro-pixel wide pitch, both for each example of an experimental test.

The first experiment used a monochrome Basler 102f FireWire digital CCD camera with 26 mm focal length lens. Preliminary results were obtained on a test picture composed of 9 macro-pixel wide strips, which include a thrice periodically repeated sequence of three-colors (RGB). The test RGB picture (R—red, G—green, B—blue) was printed on a white paper, illuminated with a white light and imaged with the Basler CCD camera using a 45° angled prism as a disperser, in the configuration shown in FIG. 13. Results are shown in FIGS. 18 and 19. FIG. 18A shows a monochrome spectrally multiplexed sensor image and FIG. 18B shows accordingly a graph of a row of FIG. 18A, both obtained with the disperser. The white horizontal line in FIG. 18A was created for alignment purposes. FIG. 18 demonstrates that the multiplexed image has "spread" borders, due to overlap of adjacent macro-pixels. FIG. 19A shows a target (sought) de-multiplexed spectral image of macro-pixel wide strips obtained by digital processing of the multiplexed sensor image in FIG. 18. FIG. 19B shows a reference spectrum of three types of colored inks under white light illumination, obtained with a simple prism spectrometer for the sake of comparison and calibration. Comparison of the spectral shape and peak positions in appropriate regions of the graph in FIG. 19A with the RGB reference spectrum of FIG. 19B shows a good match of the de-multiplexed experimental spectral imaging data to the reference spectrum of the colored inks. The RGB sequence in the macro-pixels de-multiplexed from the multiplexed monochrome sensor data appears to be the same as in original three-color (RGB) strips, as expected. Therefore, this result represents a proof of concept for the novel principle of spectral imaging with a monochromatic image sensor disclosed herein.

The second experiment used a regular digital camera (Canon EOS 30D equipped with a standard lens having a focal length of 18-55 mm) and a disperser arranged in the predetermined spatial relationship with the imager as shown in FIG. 12. Results were obtained on a test RGB picture shown in FIG. 20 and an additional reference RGB pattern shown in FIG. 21. The test RGB picture of FIG. 20 is composed of 19 macro-pixel wide strips that include a 6 times periodically repeated sequence of three-colors (RGB) and one added R. The additional reference RGB pattern of FIG. 21 is composed of 19 thin lines that include a 6 times periodically repeated sequence of the same three-colors (RGB) and one added R. Both test patterns were created on a LCD monitor with 1024×768 pixels. The test pictures and additional reference patterns were imaged, in a monochromatic mode, with the Canon EOS 30D (manufactured by Canon Corporation, Japan) camera placed at a 1 meter distance from the pictures and using the same 45° prism as a disperser. The results are shown in FIGS. 22-24.

Figure 22A:
FIG. 22A shows the monochrome multiplexed sensor image of the test RGB object of FIG. 20 acquired by a standard digital camera in a monochromatic mode.
Figure 23A:
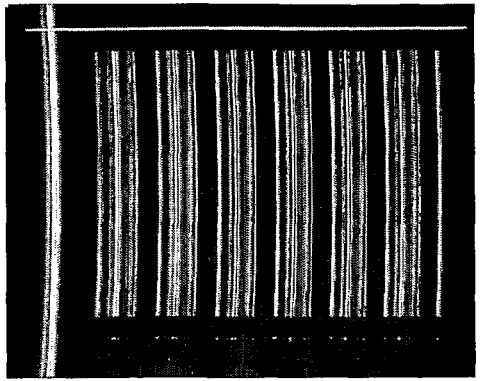
FIG. 23A shows the spectrum image of the reference slit-like line RGB pattern of FIG. 21, which serves for calibration of the multiplexed sensor image of FIG. 22.
Figure 22B:
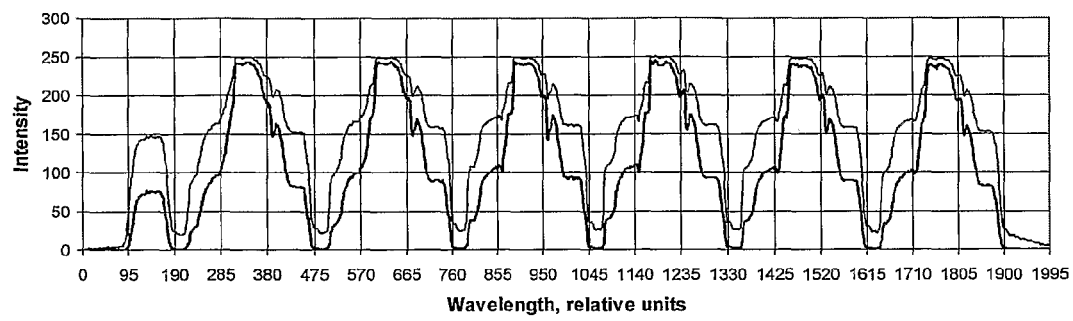
FIG. 22B shows a graph of a row of FIG. 22A.
Figure 23B:
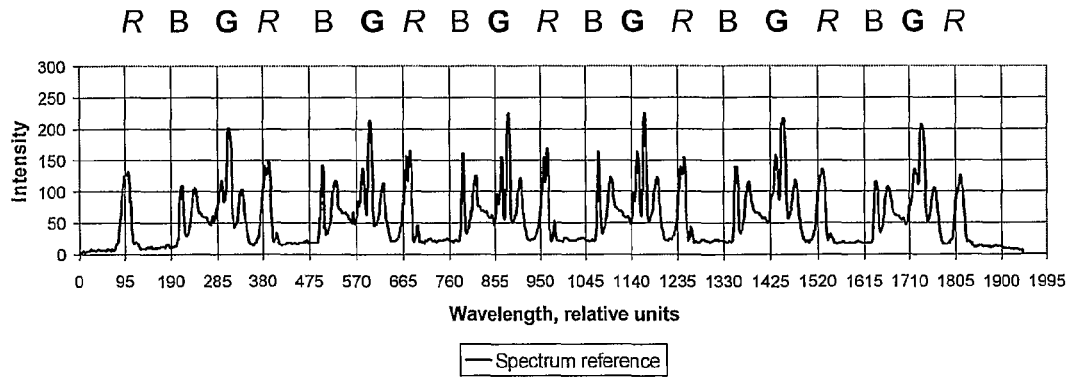
FIG. 23B shows a graph of a row of FIG. 23A.

FIG. 22A shows the monochrome multiplexed sensor image of the test RGB picture of FIG. 20 with macro-pixel wide strips, obtained with the Canon EOS 30D camera. FIG. 22B shows a graph of a central row, after correction of geometrical distortion. FIG. 23A shows the spectral image of the reference slit-like RGB pattern of FIG. 21. FIG. 23B shows a graph of a central row, after correction of geometrical distortion. The spectrum image of FIGS. 23A, B serves as reference for calibration of the multiplexed sensor image of FIG. 22A, B.

Figure 24:
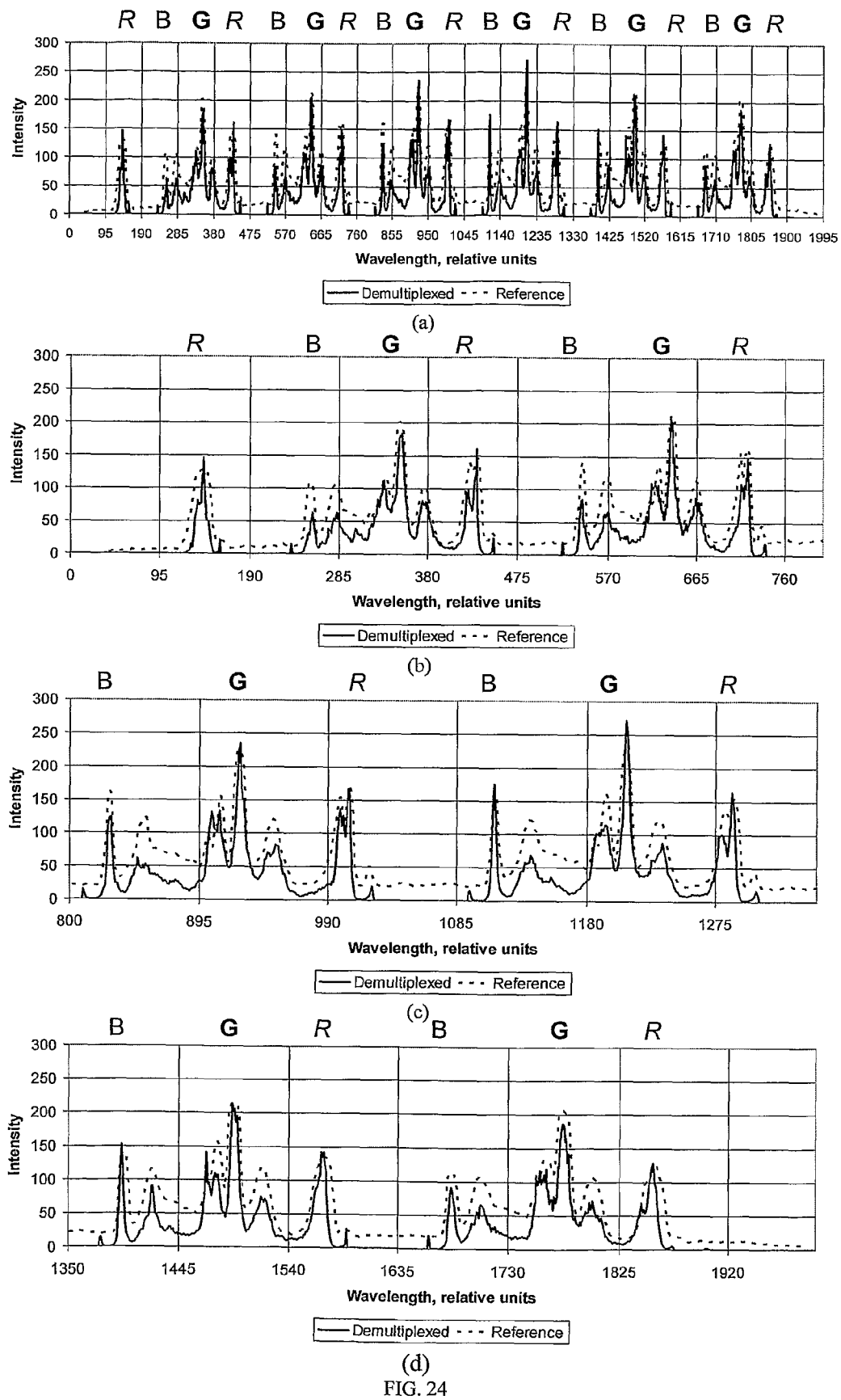
FIG. 24 shows a target de-multiplexed spectral image of the test RGB picture with macro-pixels, obtained by digital processing of the multiplexed sensor image in FIG. 22 (solid line) and, for a comparison, a reference spectrum received from the slit-like line pattern (dotted line) shown in FIG. 23: (a) full row; (b), (c) and (d)—magnified fragments of the row.

Finally, FIG. 24 shows a target de-multiplexed spectral image of the test RGB picture with macro-pixels obtained by digital processing of a row of the multiplexed sensor image in FIG. 22 (solid line). For comparison, we also plot the reference spectrum received from the slit-like line pattern (dotted line) which is the same as that shown in FIG. 23. FIG. 24a shows a full graph in the row, whereas FIGS. 24b, 24c and 24d show successive magnified fragments of the full graph in the row. The results in FIG. 24(a-d) were obtained by de-multiplexing the multiplexed image of FIG. 22 using the deconvolution procedure describe in great detail Averbuch and Zheludev above. A comparison, at each macro-pixel position, of the spectral shape and peak positions in the de-multiplexed graph (solid lines) with the RGB reference spectrum (dotted lines) shows an excellent match of the de-multiplexed spectrum to the reference spectrum of the LCD monitor colors. The RGB sequence in the macro-pixels de-multiplexed from the multiplexed monochrome sensor data also completely matches that of the original three-color (RGB) strips, as expected.

The third experiment demonstrates that our method provides spectral images of 2D pictures. The arrangement for the experiment was essentially the same as in the second experiment, except that the distance between the pictures and camera was 1.9 m, and a 18°9' prism was used as a disperser. The larger distance ensured a nearly undistorted image on the sensor, which is important for 2D object imaging and subsequent de-multiplexing. The prism dispersion in the visible spectrum range matched a macro-pixel width.

Figure 27:
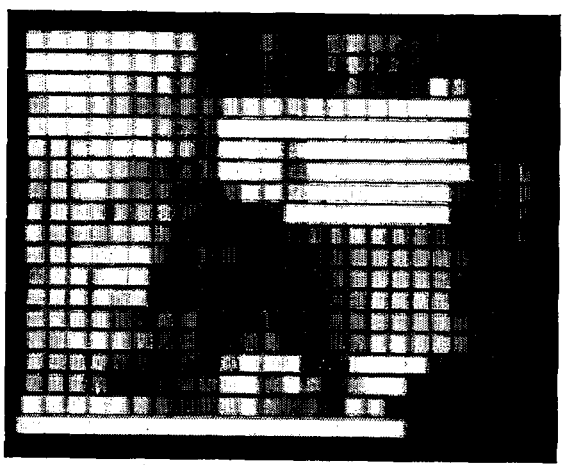
FIG. 27 shows the monochrome multiplexed sensor image of the 2D test picture of FIG. 25, received by a standard digital camera in a monochromatic mode.
Figure 28:
FIG. 28 shows the spectrum image of the reference slit-like line 2D pattern of FIG. 26, which serves for calibration of the multiplexed sensor image of FIG. 27.
Figure 29A:
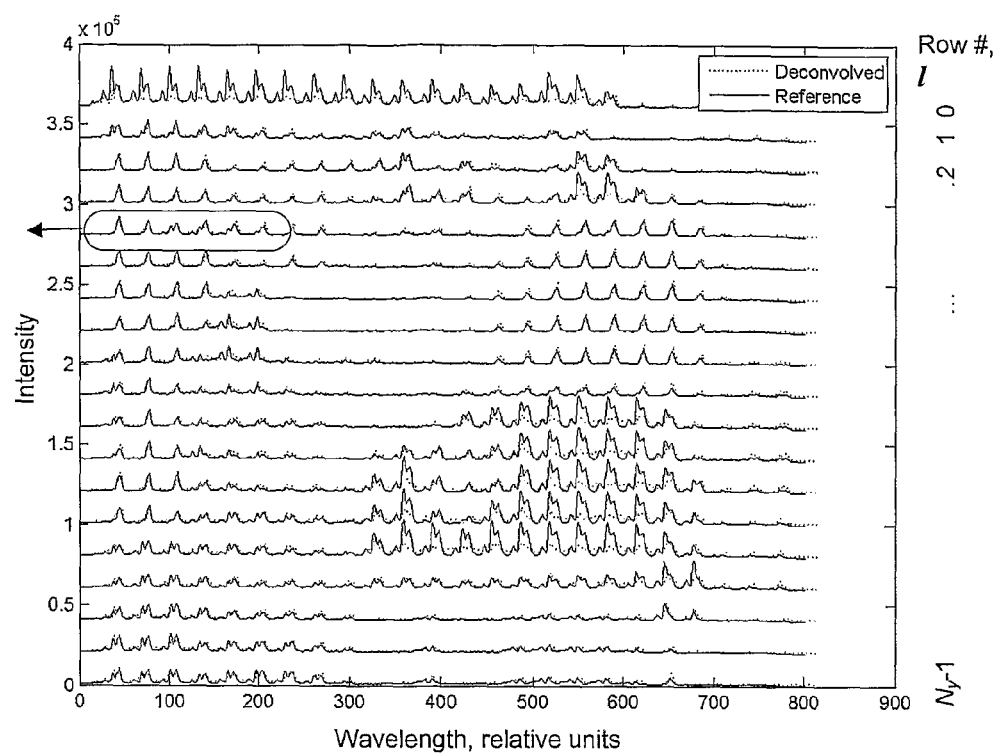
FIG. 29A shows full graphs of a target de-multiplexed spectral image of the 2D test picture of FIG. 25, obtained by digital processing of the multiplexed sensor image in FIG. 27 (solid line) and, for a comparison, a reference spectrum received from the slit-like line pattern of FIG. 28 (dotted line)

Results were obtained on a test multi-color 2D picture of several children toys. For the test purposes, the pictures were presented in a low resolution version containing 24×19 square-shape macro-pixels separated by a 20% black gap, as shown in FIG. 25. FIG. 26 shows the structure of an additional reference 2D pattern with thin slit-like lines spaced at a macro-pixel width pitch, which serves for a calibration of the 2D test picture of FIG. 25. FIG. 27 shows the monochrome multiplexed sensor image of the 2D test picture of FIG. 25, received with the Canon EOS 30D camera in a monochromatic mode. FIG. 28 shows the spectrum image of the reference slit-like line 2D pattern of FIG. 26, which serves for calibration of the multiplexed sensor image of FIG. 27. FIG. 29 shows a target de-multiplexed spectral image of a multiple-color 2D test picture with macro-pixels, which is obtained by digital processing of the multiplexed sensor image in FIG. 27 (solid line) and, for a comparison, a reference spectrum received from the slit-like line pattern of FIG. 28 (dotted line): FIG. 29A shows full graphs and FIG. 29B shows a magnified fragment of an encircled row.

Figure 29B:
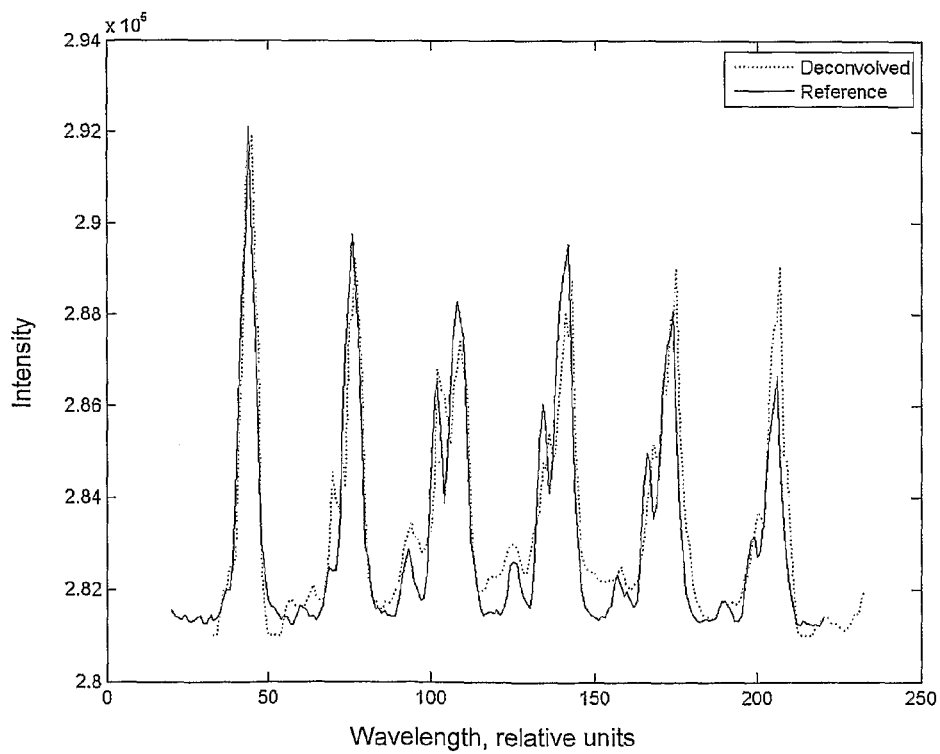
FIG. 29B shows a magnified fragment of a row encircled on FIG. 29A.

The results in FIGS. 29A and 29B were obtained by de-multiplexing the multiplexed image of FIG. 27 using the deconvolution procedure per Eq. (13) described in great detail in Shepp and Vardi above. A comparison, at each macro-pixel position, of the spectral shape and peak positions in the de-multiplexed graph (solid lines) with the reference spectrum (dotted lines) shows an excellent match of the de-multiplexed spectrum to the reference spectrum of the LCD monitor colors in respective 2D positions of the macro-pixel squares. The 2D mapping of spectra in the macro-pixels de-multiplexed from the multiplexed monochrome sensor data also completely matches that of the original 2D multiple-color squares, as expected.

SUMMARY

In summary, the basic SI camera of the present invention essentially includes a regular digital camera plus a one-dimensional disperser (prism or grating) and an optional blurring element or defocus mechanism that provide a featuresize as described and defined above at the image sensor. In some embodiments, the disperser and blurring element are included together in a disperser block. In other embodiments, the disperser is used alone, and a blurred image on the imaging sensor is obtained by defocus. The imaging sensor may be non-RGB (monochromatic) or RGB type. The present invention permits to convert practically any digital camera into a snapshot SI camera without significant design changes. Once this essentially unique aspect of the invention is understood, it is clear that the SI camera disclosed herein may be used in any application of digital cameras that requires the additional capabilities of spectral imaging. In other words, the present invention can provide commodity SI cameras. A SI camera of the present invention can be used in spectral imaging applications in biology and medicine (see e.g. Richard M. Levenson and James R. Mansfield, "Multispectral Imaging in Biology and Medicine: Slices of Life", Cytometry Part A 69A, 748-748, 2006), and specifically in optical biopsy to detect skin melanoma or to obtain functional information on blood oxygenation (see e.g. G. Kostenich et al., Cancer Letters 219 (2005), 169-175); in spectral biometric sensing (see Rowe et al., US Patent Application No. 2007/0030475); in determination, assessment and monitoring of systemic physiology and shock (see Panasyuk et al., US Patent Application Nos. 2007/0024946 and 2006/0247514); in assessing diabetes and foot and tissue disease (see Freeman et al. US Patent Application No. 2007/0038042); and in ophthalmology (see W. R. Johnson et al., J. Biomedical Optics, 12(1), 014036, January/February 2007). In particular, a SI camera of the present invention may be miniaturized through flat digital camera and digital camera-on-chip architectures and used for in-vivo SI imaging (e.g. optical biopsy) using GI pill cameras or endoscopes, in cellular phones, micro-aircraft or micro-satellites, etc.

Note that, except where otherwise stated, terms such as, for example, "comprises", "has", "includes", and all forms thereof are considered open-ended, so as not to preclude additional elements and/or features.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made. In particular, the present invention is not limited to certain parts (colors or wavelengths) of the spectrum, but is applicable to any part of the spectrum for which there are image sensors. Specifically, image sensors are known for the entire spectrum from deep ultraviolet (DUV) to far infrared (FIR). Accordingly, the present invention is applicable (but not limited to) to spectral detection and imaging over the entire spectrum from DUV to FIR.

What is claimed is:

1. An imaging system for obtaining snapshot images of an object in a number of different wavelength bands S, comprising:
   a. an image sensor having a plurality of sensor pixels in a sensor plane;
   b. an optical block having a disperser, the disperser providing at the sensor plane a light dispersion with a complete lateral dispersive shift $\Delta d$ such that $\Delta d$ matches a featuresize $\Delta$ of a spatial feature $\Phi$ of a non-dispersed image of the object formed at the sensor plane; and
   c. a mechanism for extracting from the light dispersion spectral-spatial data that can be converted into S images of the object in, correspondingly, S different wavelength bands.

2. The imaging system of claim 1, wherein spatial feature $\Phi$ is created by a defocus function of the system.

3. The imaging system of claim 1, wherein spatial feature $\Phi$ is created by an optical blurring element included in the optical block.

4. The imaging system of claim 3, wherein the image sensor has orthogonally positioned rows and columns, and wherein the dispersion is along a direction selected from the group consisting of a row direction, a column direction and a diagonal direction.

5. A method for obtaining snapshot images of an object in a number of different wavelength bands S using a digital camera, the method comprising the steps of:
   a. adding a disperser to the digital camera;
   b. using the disperser to obtain, at a camera image sensor plane, a light dispersion with a complete lateral dispersive shift $\Delta d$ such that $\Delta d$ matches a featuresize $\Delta$ of a spatial feature $\Phi$ of a non-dispersed image of the object formed at the sensor plane; and
   c. extracting from the light dispersion spectral-spatial data that can be converted into S images of the object in, correspondingly, S different wavelength bands.

6. The method of claim 5, wherein the step of adding a disperser further includes adding a blurring optical element for obtaining spatial feature $\Phi$.

7. The method of claim 5, wherein the step of using the disperser further includes using a camera defocus function for obtaining spatial feature $\Phi$.

8. An imaging system for spectrally imaging an object comprising:
   a. an optical block including a lens and a one-dimensional disperser;
   b. an image sensor having sensor pixels at a sensor plane, wherein the optical block provides, at each sensor pixel, spectral information multiplexed from at least two object points; and
   c. a mechanism for de-multiplexing and processing the de-multiplexed spectral information into spectral images of the object;
   whereby the imaging system functions as a snapshot spectral imager.

9. The imaging system of claim 8, wherein the disperser is combined with a refractive or a diffractive optical element which converts a point spread function of the spectral imaging system into to a blurred spot of a rectangular shape at the sensor plane, the blurred spot having dimensions essentially equal to those of a spatial feature $\Phi$ of a non-dispersed image of the object formed at the sensor plane.

10. The imaging system of claim 8, configured to provide through defocusing a blurred spot at the image sensor plane, the blurred spot having dimensions essentially equal to those of a spatial feature $\Phi$ of a non-dispersed image of the object formed at the sensor plane.

11. The imaging system of claim 8, wherein the disperser is a component selected from the group consisting of a prism and a weakly dispersing one-dimensional grating which provides a strong first diffraction order.

12. The imaging system of claim 8, wherein the one-dimensional disperser is spatially fixed in relation to the image sensor.

13. The imaging system of claim 8, implemented in a digital camera.

14. The imaging system of claim 13, wherein the digital camera is adapted to be included in a system selected from the group consisting of a cell-phone, a medical diagnostic device, a satellite and an unmanned aerial vehicle.

15. The imaging system of claim 14, wherein the medical diagnostic device is selected from the group consisting of an endoscope and a diagnostic pill.

16. The imaging system of claim 8, wherein the mechanism for de-multiplexing and processing includes a digital signal processor coupled to the image sensor.

17. A method for obtaining snapshot images of an object in a number of different wavelength bands S using a digital camera that has an image sensor with a plurality of sensor pixels at a sensor plane, the method comprising the steps of:
   a. at each sensor pixel, obtaining multiplexed spectral information originating from at least two different object points;
   b. de-multiplexing the spectral information to obtain a spatial-spectral data cube; and
   c. from the data cube, obtaining S images of the object in, correspondingly, S different wavelength bands.

18. The method of claim 17, wherein the step of obtaining multiplexed spectral information includes imaging the object onto the image sensor through camera lens and a disperser to obtain, at the sensor plane, a light dispersion with a complete lateral dispersive shift $\Delta d$ such that $\Delta d$ matches a featuresize $\Delta$ of a spatial feature $\Phi$ of a non-dispersed image of the object formed at the sensor plane.

19. The method of claim 18, wherein spatial feature $\Phi$ further has an area A that matches a single sensor pixel area $\delta x \cdot \delta y$ multiplied by S.

20. The method of claim 18, wherein the disperser is a one-dimensional disperser.

21. The method of claim 20, wherein the one-dimensional disperser is spatially fixed in relation to the image sensor.

22. The method of claim 17, wherein the steps of de-multiplexing and obtaining S images of the object include digital processing of respectively the spectral information and the data cube.

* * * * *